US012811959B2

(12) United States Patent
Northway et al.

(10) Patent No.: US 12,811,959 B2
(45) Date of Patent: Nov. 24, 2026

(54) SYSTEMS AND METHODS FOR SOURCE-BASED MISUSE DETECTION

(71) Applicant: NetScout Systems, Inc., Westford, MA (US)

(72) Inventors: William Northway, Ann Arbor, MI (US); Rob Skrobola, Saline, MI (US); Ryan O'Reilly, Ann Arbor, MI (US); Danielle Fritz, Canton, MI (US); Grant Levene, Chicago, IL (US); Jamie Winquist, Ypsilanti, MI (US)

(73) Assignee: NetScout Systems, Inc., Westford, MA (US)

( * ) Notice: Subject to any disclaimer, the term of this patent is extended or adjusted under 35 U.S.C. 154(b) by 49 days.

(21) Appl. No.: 18/917,992

(22) Filed: Oct. 16, 2024

(65) Prior Publication Data

US 2026/0106878 A1 Apr. 16, 2026

(51) Int. Cl.
*H04L 9/40* (2022.01)

(52) U.S. Cl.
CPC ................................ *H04L 63/1416* (2013.01)

(58) Field of Classification Search
None
See application file for complete search history.

(56) References Cited

U.S. PATENT DOCUMENTS

| | | | | |
|---|---|---|---|---|
| 9,100,428 | B1 * | 8/2015 | Visbal | H04L 63/1416 |
| 2005/0108518 | A1 * | 5/2005 | Pandya | H04L 63/0485 713/153 |
| 2008/0049641 | A1 * | 2/2008 | Edwards | H04L 43/0852 370/252 |
| 2013/0132854 | A1 * | 5/2013 | Raleigh | G06F 3/0482 715/738 |
| 2014/0198687 | A1 * | 7/2014 | Raleigh | G06Q 10/06375 370/328 |
| 2014/0248852 | A1 * | 9/2014 | Raleigh | H04W 12/068 455/566 |
| 2020/0186563 | A1 * | 6/2020 | Convertino | G06N 20/00 |
| 2025/0373654 | A1 * | 12/2025 | Feder | H04L 63/1458 |

FOREIGN PATENT DOCUMENTS

| | | | | |
|---|---|---|---|---|
| AU | 2011305214 | A1 * | 3/2013 | H04L 63/1458 |

* cited by examiner

*Primary Examiner* — Trang T Doan
(74) *Attorney, Agent, or Firm* — Foley & Lardner LLP

(57) ABSTRACT

Systems and methods for source-based misuse detection are provided. A system may store a managed objects in memory. Each of the managed objects corresponding to one or more computing devices configured to communicate over a communications network and having a configuration including one or more thresholds corresponding to network parameters for detecting an attack on the communications network. The system may monitor network traffic. The system may detect a first network parameter exceeds a threshold of a first misuse type. The system may identify a source internet protocol (IP) address associated with the first network parameter exceeding the threshold. The system may generate a tag for each source IP address indicating misuse of the communications network by the source IP address.

20 Claims, 17 Drawing Sheets

491

SYSTEMS AND METHODS FOR SOURCE-BASED MISUSE DETECTION

BACKGROUND

Communications networks suffer from network attacks that deny access to a given network service. These attacks may be primarily launched using discrete clients that may be difficult to detect. Users and administrators of the communications networks unable to determine the source of these attacks may be afflicted with negative reputation and cause propagation of these attacks to other networks, particularly so when the attacks originate from within a network managed by the administrator.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
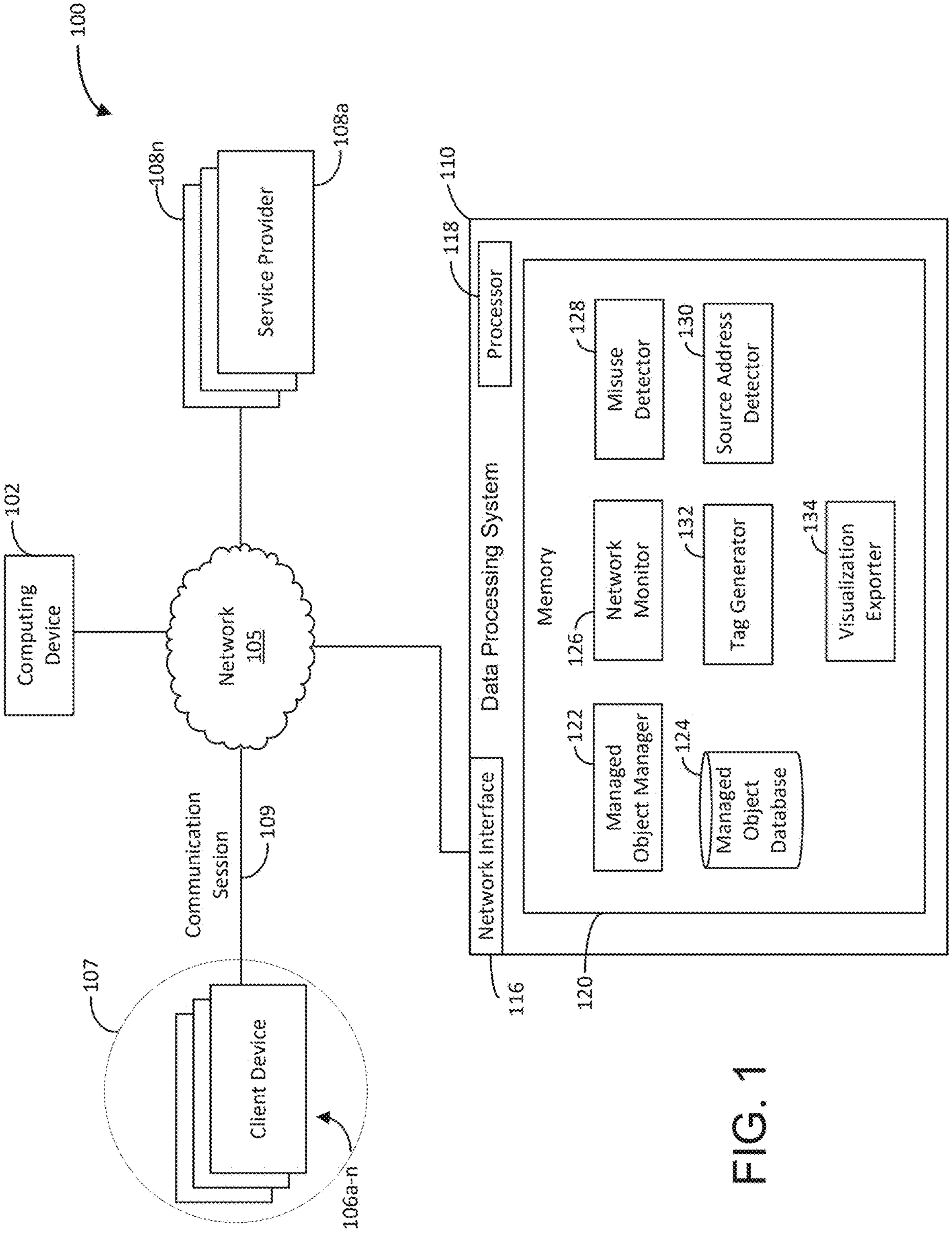
FIG. 1 is an illustration of a system for source-based misuse detection, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Distributed Denial of Service (DDoS) attacks can include intra-network traffic as well as inter-network traffic. For example, a network can be either (or both) a target of a DDoS attack and a source of the attack. The distributed nature of a DDoS attack not only complicates determining a source of the attack, it can also delay detection of an attack. Such a delay in detection can delay application of mitigating measures. Incurred delays can correspond to increased downtime of an application hosted or otherwise reliant on a targeted network resource. Even if a network is not a target of an attack, where a network includes a vector of the attack, other servers in communication with the network can deprioritize, rate limit, or blacklist resources of the network, resulting in similar interruptions to connectivity (as well as reputational harms). Accordingly, detection of network misuse related to a managed object of a network (e.g., as relating to various client devices, servers, or other computing devices associated with a network) can reduce a time to detection.

A data processing system can implement a technical solution presented according to the present disclosure. For example, the data processing system can monitor various sources related to network slices or partitions including a grouping of one or more client devices for indicia of misuse. Such partitions or other slices of a network (e.g., the one or more client devices) may be referred to herein as a "managed object" of the network. Upon a detection of misuse (e.g., a comparison of a number of indicia to a threshold), the data processing system can identify a source address for computing devices of the managed objects. The data processing system can further generate tagged data for each address according to the misuse. In some embodiments, the data processing system may present the tagged data via a user interface for a user-initiated action (e.g., upon a display of a notification relating to the tags). In some embodiments, the data processing system may compare the tagged data to one or more predefined thresholds, and based on the comparison, automatically execute a mitigating action. For example, the mitigating action can include rate limiting, terminating a network connection, or instantiating a web application firewall. The techniques described herein may result in various advantages over the aforementioned technical deficiencies. For example, adopting the source-based misuse detection process described herein using managed objects may allow for a monitoring device to detect malicious behavior at the source of a potential attack, allowing the monitoring device to perform preventative measures rather than reactionary or mitigatory actions to an attack that is either underway or that has already happened.

Systems and Methods for Source-Based Misuse Detection

FIG. 1 is an illustration of a system 100 for source-based misuse detection, in accordance with an implementation. The system 100 may aid detection of source internet protocol (IP) addresses corresponding to misuse behavior over a communications network by detecting network traffic parameters exceeding misuse thresholds. In brief overview, the system 100 can include, access, or otherwise interface with one or more of a data processing system 110 (e.g., a probe or an inspection device), that receives and/or stores data packets transmitted via a network 105 between client devices 106*a-n* (hereinafter client device 106 or client devices 106) and service providers 108*a-n*. The service providers 108 can each include a set of one or more servers 602, depicted in FIG. 6A, or a data center 608. The client device 106 may be an example of a user equipment (UE) or another device that can access the network 105. The client device 106 can communicate with the service providers 108 to access a service (e.g., a website, an application, etc.). The client device 106, the service provider 108, and the data processing system 110 can communicate or interface with via the network 105 or a side-channel link (e.g., directly).

Each of the client devices 106, the service providers 108, the computing device 102, and/or the data processing system 110 can include or utilize at least one processing unit or other logic device such as programmable logic array engine, or module configured to communicate with one another or other resources or databases. The components of the client devices 106, the service providers 108, the computing device 102, and/or the data processing system 110 can be separate components or a single component. In some embodiments, the data processing system 110 may be an intermediary device between the client devices 106 and the service providers 108. In some embodiments, the computing device 102 may be an external device (e.g., a security device, a monitoring device, etc.). In some embodiments, the computing device 102, the service provider 108, the data processing system 110, or any combination thereof, may share at least some components or be the same device. The system 100 and its components can include hardware elements, such as one or more processors, logic devices, or circuits.

The client devices 106, the service providers 108, the computing device 102, and/or the data processing system 110 can include or execute on one or more processors or computing devices (e.g., the computing device 603 depicted in FIG. 6C) and/or communicate via the network 105. The network 105 can include computer networks such as the Internet, local, wide, metro, or other area networks, intranets, satellite networks, and other communication networks such as voice or data mobile telephone networks. Via the network 105, the client device 106 can access information resources such as web pages, web sites, domain names, or uniform resource locators that can be presented, output, rendered, or displayed on at least one computing device (e.g., client device 106), such as a laptop, desktop, tablet, personal digital assistant, smart phone, portable computers, or speaker. For example, the client devices 106 can communicate, via the network 105, with the servers of the service providers 108 for data (e.g., a communication session including requests from the client devices 106 and responses from the service providers 108).

At least a portion of the client devices 106 may be a part of a managed object 107. The managed object 107 may be a grouping of one or more client devices 106, routers, gateways, or any other computing device or element that communicates or facilitates communication across a network. In some cases, not depicted, multiple managed objects 107 may include various groupings of respective client devices 106. The communication sessions of each client device 106 of a managed object 107 may be a part of managed object network traffic 109 between the managed object 107 and the service providers 108, via the network 105. For example, a first managed object 107 may include one or more client devices 106. The managed object network traffic 109 may include requests from the one or more client devices 106 of the first managed object 107 and associated responses from the service providers 108.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS"), universal mobile telecommunications system ("UMTS"), 3G, 4G, long term evolution wireless broadband communication ("LTE"), 5G, etc. Different types of data may be transmitted via different protocols, or the same types of data may be transmitted via different protocols. In some embodiments, the network 105 may be or include a self-organizing network that implements a machine learning model to automatically adjust connections and configurations of network elements of network 105 to optimize network connections (e.g., minimize latency, reduce dropped calls, increase data rate, increase quality of service, etc.).

The service provider 108 can be hosted by a third-party cloud service provider via a virtual environment. The service provider 108 can be hosted in a public cloud, a co-location facility, or a private cloud. The service provider 108 can be hosted in a private data center, or on one or more physical servers, virtual machines, or containers of an entity or customer. The service providers 108 may each be or include servers or computers configured to transmit or provide services across network 105 to client devices 106. The service providers 108 may transmit or provide such services upon receiving requests for the services from any of the client devices 106. The term "service" as used herein includes the supplying or providing of information over a network and is also referred to as a communications network service. Examples of services include 5G broadband services, any voice, data or video service provided over a network, smart-grid network, digital telephone service, cellular service, Internet protocol television (IPTV), etc. The service may further include a SaaS application, such as a word processing application, spreadsheet application, presentation application, electronic message application, file storage system, productivity application, microservice thereof, or any other SaaS application. The service provider 108 can be hosted or refer to cloud 610 depicted in FIG. 6B.

The client device 106 can be located or deployed at any geographic location in the network environment depicted in FIG. 1. The client device 106 can be deployed, for example, at a geographic location where a typical user using the client device 106 would seek to connect to a network (e.g., access a browser or another application that requires communication across a network). For example, a user can use a client device 106 to access the Internet at home, as a passenger in a car, while riding a bus, in the park, at work, while eating at a restaurant, or in any other environment. The client device 106 can be deployed at a separate site, such as an availability zone managed by a public cloud provider (e.g., a cloud 610 depicted in FIG. 6B). If the client device 106 is deployed in a cloud 610, the client device 106 can include or be referred to as a virtual client device or virtual machine. In the event the client device 106 is deployed in a cloud 610, the packets exchanged between the client device 106 and the service providers 108 can still be retrieved by the data processing system 110 from the network 105. The computing device 102 may be similar to client devices 106. In some cases, the client devices 106 and/or the data processing system 110 can be deployed in the cloud 610 on the same computing host in an infrastructure 616 (described below with respect to FIG. 6B).

The data processing system 110 may comprise one or more processors that are configured to monitor (e.g., obtain) network traffic (e.g., data packets) from the service providers 108 during a communication session between the client device 106 and the service providers 108 and detect network parameters associated with misuse types. The data processing system 110 may comprise a network interface 116, a processor 118, and/or memory 120. The data processing system 110 may communicate with any of the computing device 102, the client devices 106, and/or the service providers 108 via the network interface 116. The processor 118 may be or include an ASIC, one or more FPGAs, a DSP, circuits containing one or more processing components, circuitry for supporting a microprocessor, a group of processing components, or other suitable electronic processing components. In some embodiments, the processor 118 may execute computer code or modules (e.g., executable code, object code, source code, script code, machine code, etc.) stored in the memory 120 to facilitate the operations described herein. The memory 120 may be any volatile or non-volatile computer-readable storage medium capable of storing data or computer code.

The memory 120 may include one or more of a managed object manager 122, a managed object database 124, a network monitor 126, a misuse detector 128, a source address detector 130, a tag generator 132, and a visualization exporter 134. The data processing system 110 may further include other components, managers, handlers, etc. to perform the techniques as described herein. The data processing system can, based on the operations of the components 122-134 perform one or more mitigation actions, send data corresponding to the source IP addresses and the tags to an external device (e.g., computing device 102), generate an alert based on a severity of the misuse (e.g., based on an amount of source IP addresses exceeding the misuse threshold), or a combination thereof, among other actions.

The managed object manager 122 may comprise programmable instructions that, upon execution, cause the processor 118 to manage managed objects, such as by storing information related to the managed objects 107 in memory 120 (e.g., in the managed object database 124) having a configuration including one or more thresholds corresponding to network parameters for detecting attacks on the network 105. The object manager 122 can receive indications to add or remove various devices (e.g., client devices 106) from a managed object 107. For example, the object manager 122 can interface with a directory system such as Active Directory to receive indications of various groupings of devices according to users of the devices (e.g., user credentials, user groups, or other role-based grouping). In some embodiments, the managed object manager 122 can include one more instance of a user interface to present groupings of users, such that devices can be added to or removed from a managed object 107. In some embodiments, the managed object manager 122 can determine which client devices 106 should be included in a managed object according to a physical or logical (e.g., network) location, a type of device, enterprise departments, an inclusion of particular applications (e.g., remote management software), usage analysis, load balancing considerations, or other criteria.

The network monitor 126 may comprise programmable instructions that, upon execution, cause the processor 118 to monitor network traffic (e.g., data transferred via the network 105 as part of a communication session, managed object network traffic 109) from client devices 106 of a managed object 107 and service providers 108. For example, the network monitor 126 can operate at one or more routers, switches, servers, or other network infrastructure device, or according to distributed operation locally on various managed devices (e.g., client devices 106 of the managed objects 107 managed by the managed object manager 122). The network monitor 126 can monitor a health or performance of a network 105, and may detect inbound, outbound, or intra-network traffic as may be indicative of a DDoS attack. Incident to detection of indicia of such an attack, the network monitor 126 can block malicious traffic, implement rate-limiting, scan for malware, monitor device behavior, or interface with various other of the components 122-134 (e.g., to cause the managed object manager 122 to deploy the updated security, or quarantine devices).

The misuse detector 128 may comprise programmable instructions that, upon execution, cause the processor 118 to detect a first network parameter of managed object network traffic 109 of a first set of client devices 106*a-n* of the managed object 107 exceeds a threshold of a first misuse type of a set of misuse types. In some embodiments, the misuse detector 128 may detect various second network parameters of managed object network traffic 109 of the first set of client devices 106*a-n* of the managed object 107 exceeds a threshold of various corresponding second misuse types of the set of misuse types.

The misuse detector 128 may operate in conjunction with either of the managed object manager 122 (to detect misuse at a device) or the network monitor 126 (to detect misuse according to inter-device traffic). The misuse detector 128 an detect patterns associated with misuse, according to device data, network traffic, or a combination thereof. For example, the misuse-detector can detect patterns of misuse by comparing behavior to a set of predefined rules. In some embodiments, the misuse detector 128 may detect misuse according to a comparison of monitored activity with a predefined threshold (e.g., excessing traffic), or a matching of network activity with predefined criterion (e.g., traffic exchanged with a predefined address, which may also be referred to as exceed a predefined threshold of zero).

The source address detector 130 may comprise programmable instructions that, upon execution, cause the processor 118 to identify a source IP address for each client device 106 (e.g., computing devices of the managed object 107) of the first set of client devices 106*a-n*. For example, the source address detector 130 may identify the source address responsive to the detection, of the misuse detector 128, that the first network parameter exceeds the threshold, or that any of various second network parameters exceed a corresponding second threshold. To determine the source address, the source address detector 130 can extract header information (e.g., 3-tuple, 4-tuple, or 5-tuple information) of packets traversing a network. In some embodiments, the source address can be determined according to a source in the tuple information. In some embodiments, the source address can be determined according to further operations, such as by determining a flow of traffic preceding a transmission of a packet. For example, where a network node is amplifying a DDoS attack, the source address detector 130 can determine a proximal source of the amplifying node, and thereafter determine another source in communication with the amplifying node. That is, the source address detector 130 can perform tracing to determine a source of a DDoS attack.

In some embodiments, the source address detector 130 may apply, propagate, or append block lists or deny lists for malicious services based on detected sources. For example, the source address detector 130 can log source data, correlate source address data with security events, and present such data via a user interface instance or automatically modulate network operation based thereupon (e.g., in conjunction with a mitigator of the data processing system).

The tag generator 132 may comprise programmable instructions that, upon execution, cause the processor 118 to generate a tag indicating misuse of the communications network. For example, the tag can be generated for the first managed object 107 for each source IP address detected to be misusing the communications network. The tag generator 132 may generate tags on a per-source or per-misuse type basis. For example, in some embodiments, the tag generator 132 may generate one or multiple tags for a particular source detected, by the source address detector 130, as a source of network misuse. In some embodiments, the tag generator 132 may generate one or multiple tags for one type of misuse of various sources determined by the source address detector 130. The tags may be indexed to enhance searchability of a log, or processing of further of the components 122-134 of the data processing system. For example, the visualization exporter 134 may generate visualizations based on the generated tags.

The tag generator 132, or other of the components 122-134 of the data processing system 110 may generate alerts. Such alerts may include alerts provided directly from the tag generator 132 (or the misuse detector 128), or according to operation of multiple of the components 122-134. For example, the tag generator 132 may, in conjunction with the misuse detector 128 and the managed object manager 122, generate an alert related to a client device of a managed object 107 (e.g., as based on local data of the device). The tag generator 132 may, in conjunction with the misuse detector 128 and the network monitor 126, generate an alert related to a network traffic as detected at a monitored network infrastructure device (e.g., as based on traffic relating to one or more devices).

The visualization exporter 134 may comprise programmable instructions that, upon execution, cause the processor 118 to generate graphs, heat maps, tables, dashboards, or other visualizations of network activity. For example, the visualization exporter 134 can generate any of the various visualizations depicted herein, such as the visualizations 200, 300, 400 of FIGS. 2-4I. In some embodiments, the visualization exporter 134 can exchange prompts via a user interface to adjust presented visualizations or incident to other operation of the various components 122-134 of the data processing system 110.

Figure 2:
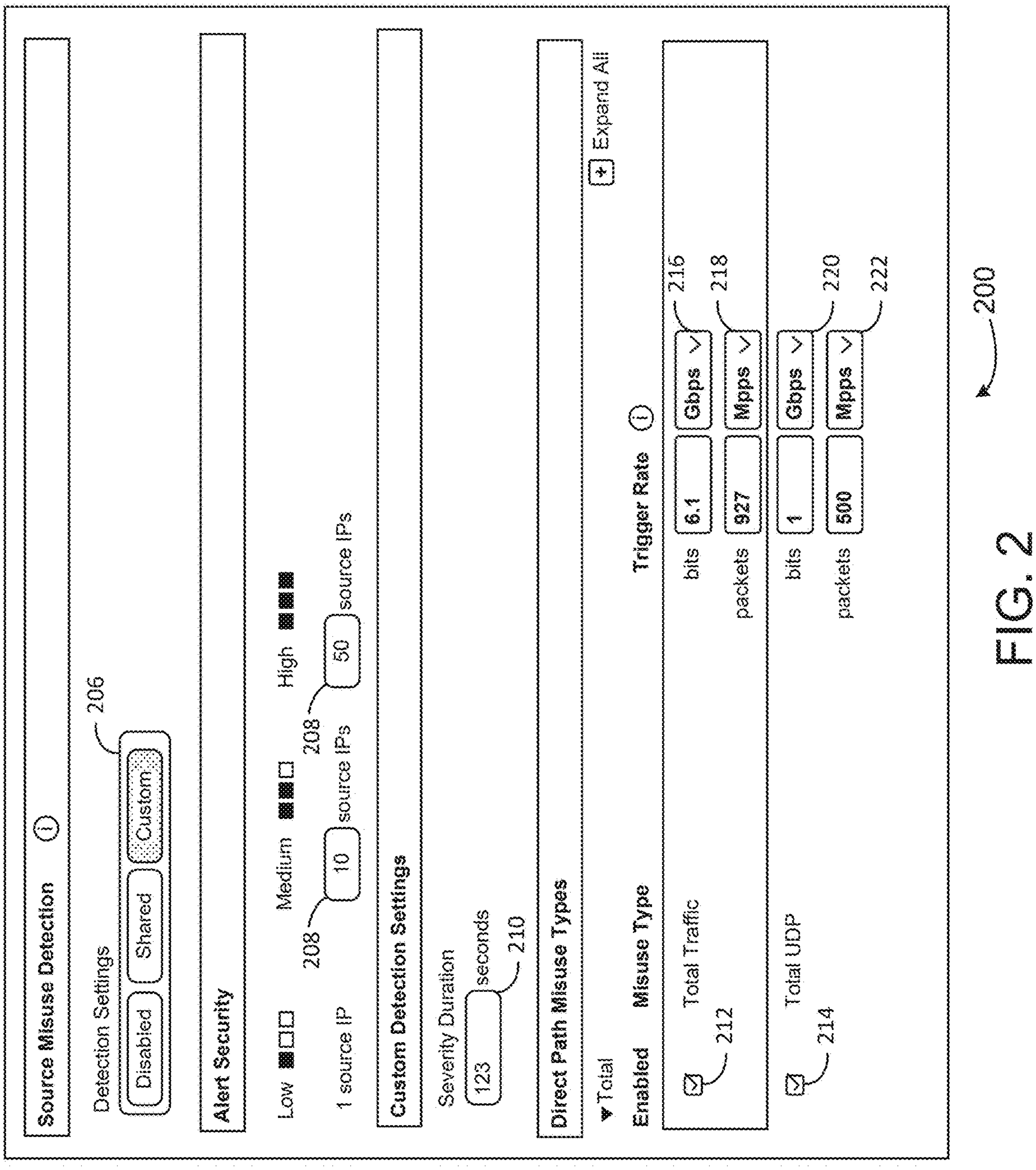
FIG. 2 is an illustration of a user interface of a system for visualization of source-based misuse detection, in accordance with an implementation.

FIG. 2 is an illustration of a user interface of a system presenting a visualization 200 of source-based misuse detection, in accordance with an implementation. The user interface may present an indication of a configuration of a system for source-based misuse detection, such as the data processing system 110 of FIG. 1. Further, the user interface may present various control elements to obtain user-indications to modulate an operation of the data processing system 110 (or other system for source-based misuse detection). For example, the user interface can expose configurable settings thereof. The depicted instance of the user interface should not be construed as limiting the present disclosure. Various embodiments of the present disclosure can receive various configuration settings via further instances of a user interface configuration files, or other data sources.

The selected instance includes one or more control elements related to operation of source user detection. Although referred to as input control elements, the various control elements can also display information, such as a selected state, which may be used to review a current configuration, even where no selectable options are changed. Indeed, in some embodiments, permissions related to the various instances of the user interface can include view only modes or edit and view modes, or display elements may be provided as view only or editable.

A detection mode selector 206 can include sub-elements to disable operation of source-misuse detection, share configuration settings between managed objects 107, or enter custom settings for a managed object 107. Selection of a sub-element can modulate other control elements displayed (or active) in the visualization 200. For example, upon a selection of a disabling sub-element, further control elements may not be displayed, or may be displayed as inactive (e.g., may be greyed out). Upon a selection of a sharing sub-element, further controls can be provided to relate configuration options between various managed objects 107. Such controls can include global configuration settings such as instances of the depicted controls mapped to every managed object 107 for a data processing system 110 (or to every managed object 107 corresponding to a selection of "shared"). In some embodiments, further control elements can relate to groupings of the managed objects 107, which may be managed according to the same or a common set of configuration settings. For example, the control elements can relate to a shared configuration (e.g., shared between the various managed objects 107). Upon a selection of a custom sub-element (as is depicted), the further depicted control elements may be provided.

The selected instance includes one or more control elements related to severity thresholds. For example, the severity threshold may be configured according to a selectable number of source IP addresses. A number of source IP addresses may be entered according one or more drop down selections, slider bars, numerical entry fields 208, or other input control elements. Such control elements can be provided for one or more severities. For example, as depicted, a separate numerical entry field 208 for each of a medium and high severity is provided, wherein a low priority is provided as a fixed value. In further embodiments, different selections or priorities may be provided (e.g., priorities 1 though 10). The number of source IP addresses may relate to a number of source IP addresses detected simultaneously, or within another fixed period (e.g., within a same hour, within a 24-hour period, etc.). The severity may relate to an alert severity, but is not so limited. For example, the severity may further relate to automatic or other mitigations as may be selected from another user interface instance of the sidebar 202.

The selected instance includes one or more control elements related to a severity duration 210. For example, a severity duration 210 may operate as a fixed period referred to with reference to the severity threshold, above, or may relate to other elements which may be depicted in a same visualization 200 or omitted therefrom. For example, the severity duration 210 may relate to a trigger rate of packets or data, to avoid triggering an alert responsive to normal operation including bursty transfers. That is, a severity duration 210 may be selected to avoid triggering an alert for a number of packets or data transferred in a period less then a selected duration (e.g., alerts related to very high bandwidth operation for hundreds of milliseconds to several seconds may be suppressed). For example, according to a selection of 123 seconds an average throughput for periods of less than 123 seconds will not trigger some alerts. This is not intended to provide global suppression of all alerts. As is indicated in the figure, other thresholds may correspond to, for example, "fast flood alerts" related to rapid-onset DDoS attacks.

The selected instance includes one or more control elements related to path misuse type, such as for a throughput trigger. Such throughput triggers can relate to (and be individually selectable for) total traffic 212, as well as profiled traffic. Profiled traffic can include UDP traffic 214, TCP traffic, ICMP traffic, total number of connections/disconnections, traffic from within a defined (e.g., narrow) range of source IPs, geographic locations related to source IPs, or other information as may be profiled by a system including or interfacing with the data processing system 110. Trigger rates may be selectable for total traffic 212, as well as profiled traffic. For example, total traffic may be selectable according to data-throughput 216 and packet throughput 218. Some profiled data, such as total UDP traffic may also be selectable according to data-throughput 220 and packet throughput 222. In some embodiments, misuse types can be categorized according to a source port, destination port, protocol, or average bytes per packets. A trigger can correspond to any such category. However, the provided illustrative examples are not intended to limit the present disclosure; further trigger selections may be provided according to a number of connections/disconnections, or selections of geographic regions. Selections may be provided according to various instances of control elements, such as numeric or textual entry fields, drop down menus, slider bars, partial IP or subnet matching fields, or so forth. Upon a detection of a throughout reaching one or more triggers, the system can generate alerts for presentation or automatically perform mitigation actions such as rate-limiting, severing connections with a client device 106 of a managed object 107, pushing software updates, or so forth.

Figure 3A:
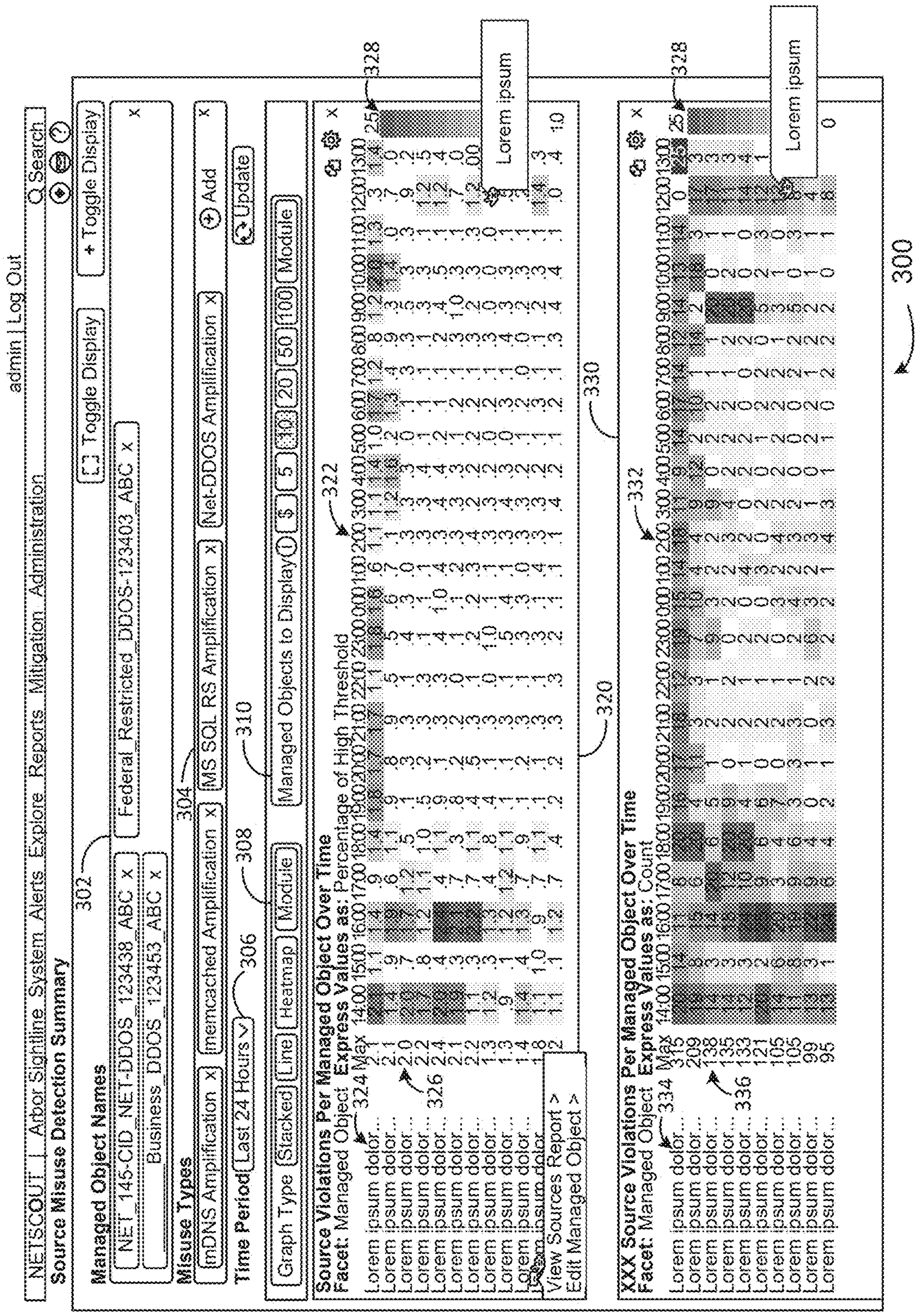
FIGS. 3A-3B are illustrations of user interfaces of systems for visualization of source-based misuse detection, in accordance with an implementation.
Figure 3B:
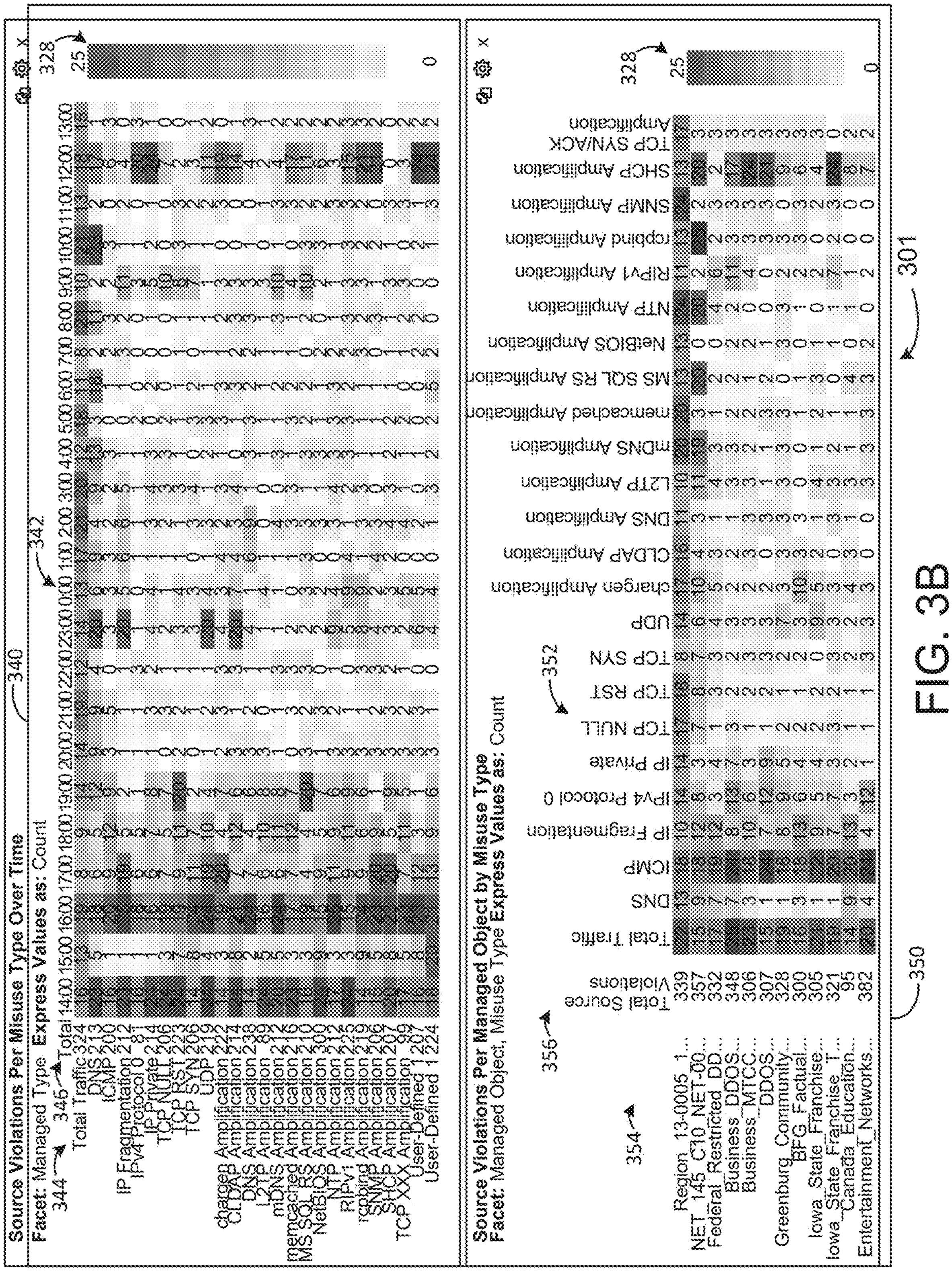

FIGS. 3A-3B are illustrations of user interfaces of systems presenting visualizations 300 and 301 of source-based misuse detection, in accordance with an implementation. More particularly, FIGS. 3A-3B include heat maps related to source-based misuse alerts for managed objects 107 of a data processing system 110. The heat maps may provide a graphical depiction of a frequency or magnitude of violations of selected misuse types related to one or more selected managed objects 107.

A managed object selector 302 can control elements which are used to select managed objects 107. Selected managed objects 107 can be unselected according to a deselection (depicted according to an illustrative example of an x on each instance of the managed objects 107). Unselected managed objects 107 can be selected according to another control, such as a selection of white space within the managed object selector 302 or according to a dedicated control therefor (e.g., an "add" control element). A number of displayed managed objects may correspond to a selection of a numerical element 310 of the managed object selector 302. For example, a selection of five managed objects 107 in the numerical element 310 of the managed object selector 302 can cause a display of five managed objects having a greatest frequency or number of alerts or traffic, or as may be selected as most relevant according to further criteria.

A misuse type selector 304 control element depicts particular misuse types (e.g., particular DDoS attack types). For example, the preset illustrative example includes a selection of multicast DNS amplification, distributed memory caching server amplification, SQL reporting services amplification, and network-distributed amplification. Like the managed objects 107 discussed above with regard to the managed object selector 302, selected misuse types can be unselected according to deselection, and unselected misuse types can be selected for inclusion in a presentation (e.g., in the heatmaps as are further discussed below). A temporal selector 306 control element can depict and receive a user entry for a time period for display (e.g., daily, weekly, annually, or for a previous 24-hour period). A graph selector 308 control element can select between various modes of visualization, such as the selected heatmap of the depicted visualization 300. Further visualization modes may include line graphs, bar graphs, module-based display, or other visual depictions of the selected data.

According to the selection of configurable values via the user interface, above, or as otherwise obtained, the data processing system 110 can generate and cause to be displayed via the user interface, a first heatmap 320. The first heatmap 320 includes a temporal axis 322, depicted as provided according to hourly intervals, but which may be provided according to any interval (e.g., quarterly, minutely, or daily). The first heatmap 320 includes a managed object access axis 324 including various managed objects or aspects thereof. At an intersection of each value of the temporal axis 322 and the managed object access axis 324, an indication of a frequency of source violations is provided. More particularly, the frequency is provided as normalized to an alert threshold (e.g., for forty observed source violations in a time period corresponding to threshold alert of fifty, a normalized value of 75% or 0.75 may be provided). Further statistical columns, such as a maximum normalized value column 326, average normalized value, or so forth may be provided in the first heatmap 320.

A cell corresponding to each intersection can be shaded or colored (e.g., a field, border, or other portion of the cell) to according to a predefined mapping between the normalized value and the color, hue, fill intensity, or the like (e.g., red for values exceeding a threshold, yellow for values near a threshold, and green for values below a threshold). In some embodiments, either of the numeric normalized values or colors may be omitted to aid in clarity. For example, a first heatmap 320 omitting numeric values may present data according to a greater density than can be perceived or displayed by a particular display. Likewise, cells of further heatmaps provided herein may be shaded or colored according to predefined mappings with other values, and can similarly include or omit various information. For example, coloring or shading of a second heatmap 330, third heatmap 340, or fourth heatmap 350 can correspond to respective counts thereof, according to the predefined mapping. The respective heatmaps can further include a color or shading scale 328 to provide an indication of the mapping. Such a scale 328 (and mapping) may, according to various embodiments, be fixed or dynamic (e.g., to automatically adjust to data contents of the respective heat maps).

Referring again to the second heatmap 330, the data processing system 110 can generate and cause to be displayed this heatmap based on the configuration values. The second heatmap 330 includes a temporal axis 332, depicted as provided according to hourly intervals, but which may be provided according to any interval, in various embodiments or instances thereof. The second heatmap 330 includes a managed object access axis 334 including various managed objects or aspects thereof. At an intersection of each value of the temporal axis 332 and the managed object access axis 334, an indication of a frequency of source violations is provided. More particularly, the frequency is provided as a count. The count may be provided as an absolute count, or a scaled value (e.g., in tens, hundreds, or thousands) as may be depicted, along with the coloring or shading, as described above. For example, according to depicted data values extending between zero and twenty-five, an absolute count can be provided. Further statistical columns, such as a maximum count column 336, total count column, average count column, or so forth may be provided in the second heatmap 330.

Referring again to the third heatmap 340 (and to visualizations 301 of FIG. 3B), the data processing system 110 can generate and cause to be displayed this heatmap based on the configuration values. The third heatmap 340 includes a temporal axis 342, depicted as provided according to hourly intervals, but which may be provided according to any interval, in various embodiments or instances thereof. The third heatmap 340 includes a violation type axis 344 including various types of misuse (e.g., Total traffic, DNS traffic, ICMP traffic, IP fragmentation, and various further predefined or user-defined mis-use types). At an intersection of each value of the temporal axis 342 and the violation type axis 344, an indication of a frequency of source violations is provided. More particularly, the frequency is provided as a count. The count may be provided as an absolute count, or a scaled value (e.g., in tens, hundreds, or thousands) as may be depicted, along with the coloring or shading, as described above. Further statistical columns, such as a maximum count column, total count column 346, average count column, or so forth may be provided in the third heatmap 340.

Referring again to the fourth heatmap 350, the data processing system 110 can generate and cause to be displayed this heatmap based on the configuration values. The fourth heatmap 350 includes a violation type axis 352, depicted as provided according to hourly intervals, but which may be provided according to any interval, in various embodiments or instances thereof. The fourth heatmap 350 includes a managed object access axis 354 including various managed objects or aspects thereof. At an intersection of each value of the violation type axis 352 and the managed object access axis 354, an indication of a frequency of source violations is provided. More particularly, the frequency is provided as a count. The count may be provided as an absolute count, or a scaled value (e.g., in tens, hundreds, or thousands) as may be depicted, along with the coloring or shading, as described above. Further statistical columns, such as a maximum count column, total count column 356, average count column, or so forth may be provided in the fourth heatmap 350.

FIGS. 4A-4I are illustrations of user interfaces of systems presenting visualizations 400, 421, 431, 441, 451, 461, 471, 481, 491 of source-based misuse detection, in accordance with an implementation. More particularly, the visualizations 400, 421, 431, 441, 451, 461, 471, 481, 491 can depict information corresponding to a single managed object 107 (which, as indicated above, can include any number of client devices). The various visualizations 400, 421, 431, 441, 451, 461, 471, 481, 491 can be generated for presentation by the data processing system 110. For example, the visualizations 400, 421, 431, 441, 451, 461, 471, 481, 491 can be provided via further instances of the user interface of FIGS. 3A-3B. In some embodiments, the various visualizations may be provided as frames, windows, overlays, or other aspects of a user interface presented concurrently via a same display output. Accordingly, aspects of the various visualizations of FIGS. 4A-4I can be omitted, added to, substituted, or exchanged between the various of the visualizations.

Figure 4A:
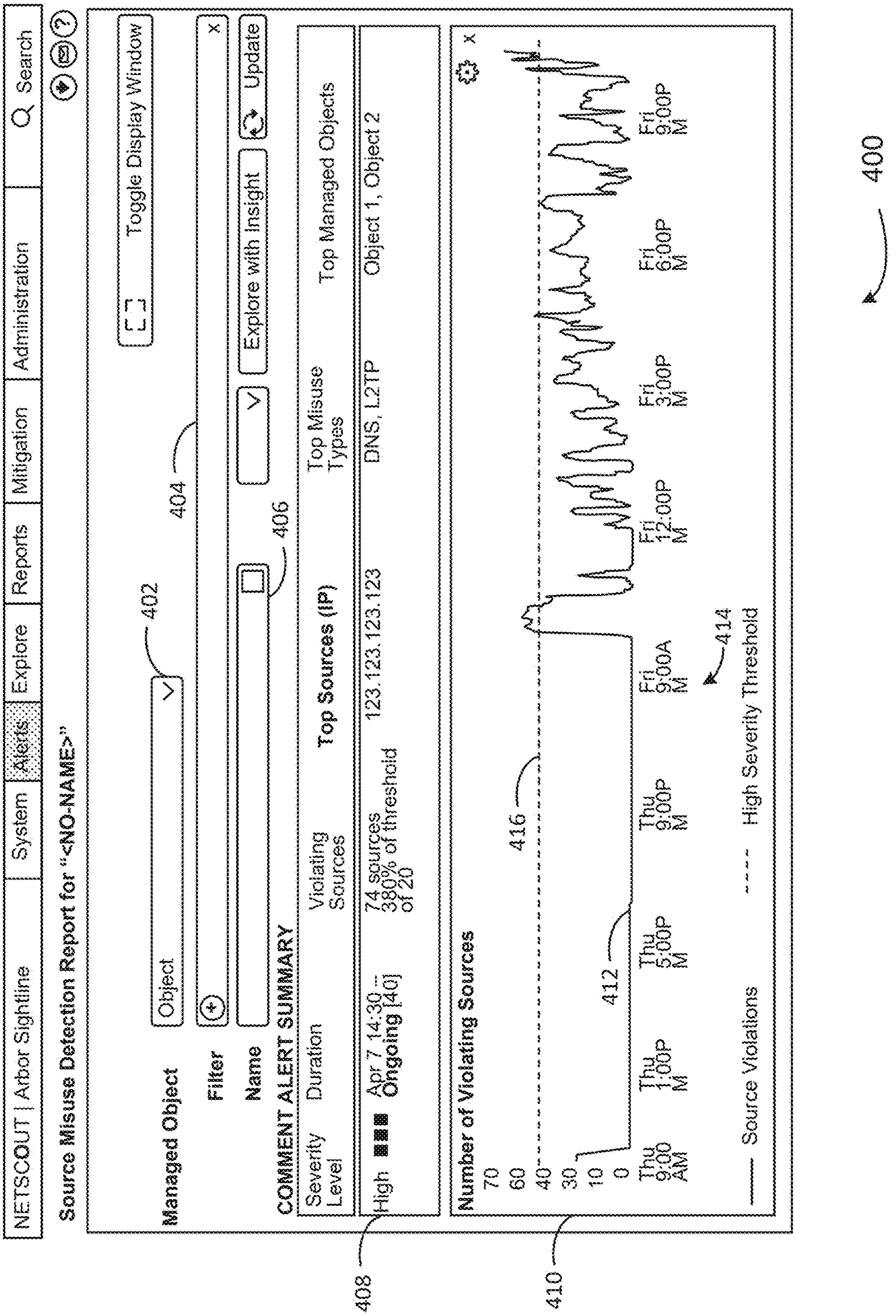
FIGS. 4A-4I are illustrations of user interfaces of systems for visualization of source-based misuse detection, in accordance with an implementation.

Referring particularly now, to FIG. 4A, a first visualization 400 may include an object depiction 402 for a corresponding managed object 107. Further included may be filters 404, search bars 406, drop down selections, or other control elements to prompt a user to provide a response to select a managed object 107 (e.g., a different managed object). Where the managed object 107 is currently associated with (e.g., experiencing) a source misuse detection alert, alert-related information 408 may be depicted. Likewise, where no alert is present, because an alert threshold has not been met, similar sub-threshold information may be presented. In either case, the alert-related information 408 can include an indication of the ongoing alert (e.g., an indication of alert severity), an indication of the duration and timeframe of the current alert, a maximum number of observed sources in violation during the alert duration, one or more top sources (depicted as an IP address), one or more top violations, and one or more top destination managed objects 107 that traffic was directed to for the alert duration. A line graph 410 can provide an indication 412 of a number of violating sources relative to a temporal axis 414. The line graph 410 can further include one or more severity threshold lines 416, such as a high priority severity threshold line 416, moderate priority severity threshold line 416, or so forth.

Figure 4B:
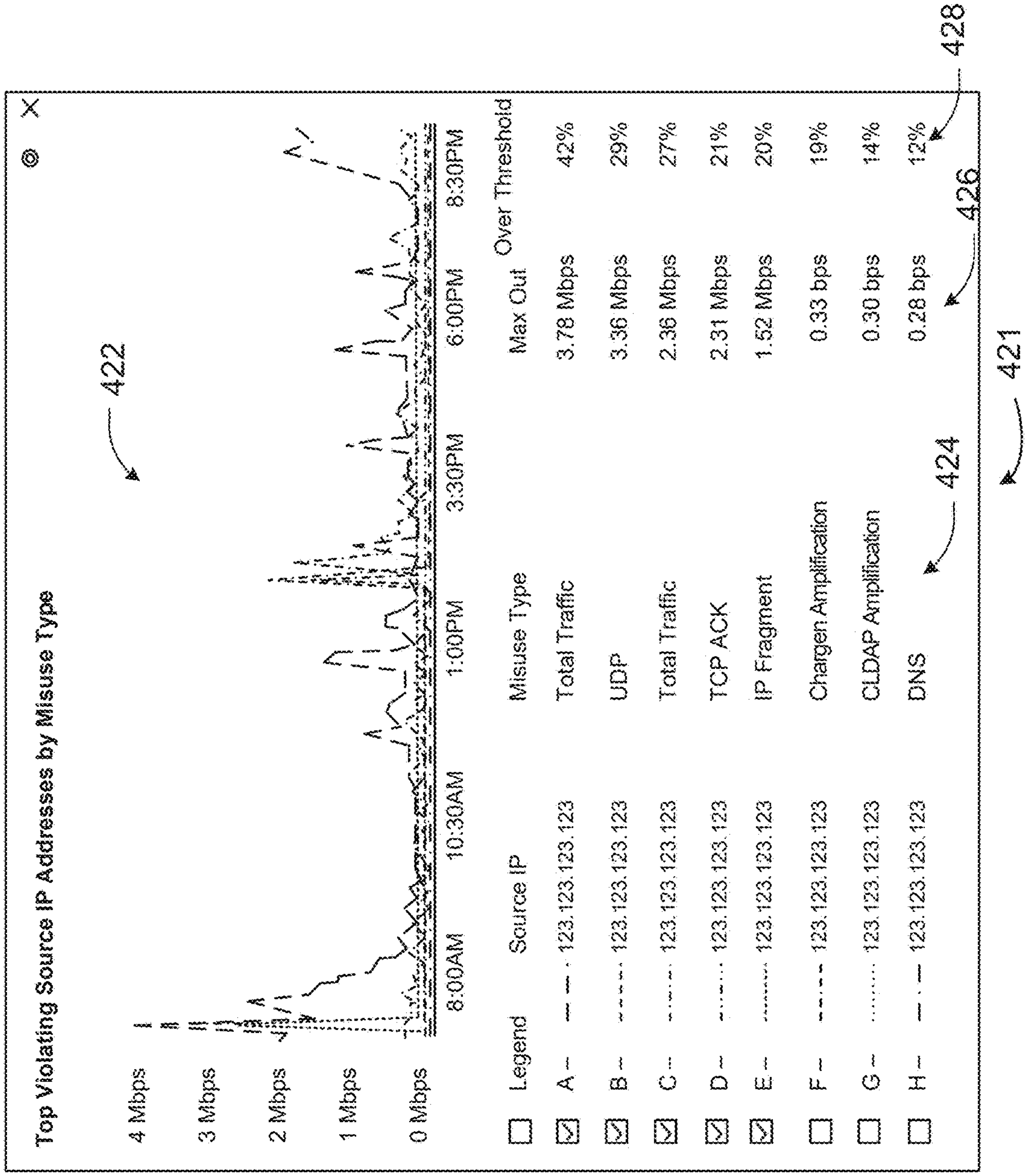

Referring now to FIG. 4B, a visualization 421 provides a time-series (line) graph 422 of the traffic bandwidth by misuse type. The time-series graph 422 may depict an element corresponding to each violation in excess of a selected threshold during the time-series duration, and may further include a threshold line 416 therefor. The time-series graph 422 may provide the bandwidth according to bits per time interval, packets per time interval, or another indication of throughout. A corresponding table 424 provides a legend correlating the elements of the time-series graph 422 to a particular misuse type. That is, separate elements may be provided for a same source for multiple misuse types (as is depicted), or for different sources of a same misuse type. The table 424 can further include statistical data such as a maximum 426 or average output throughout per element, percent over a threshold 426, or so forth.

Figure 4C:
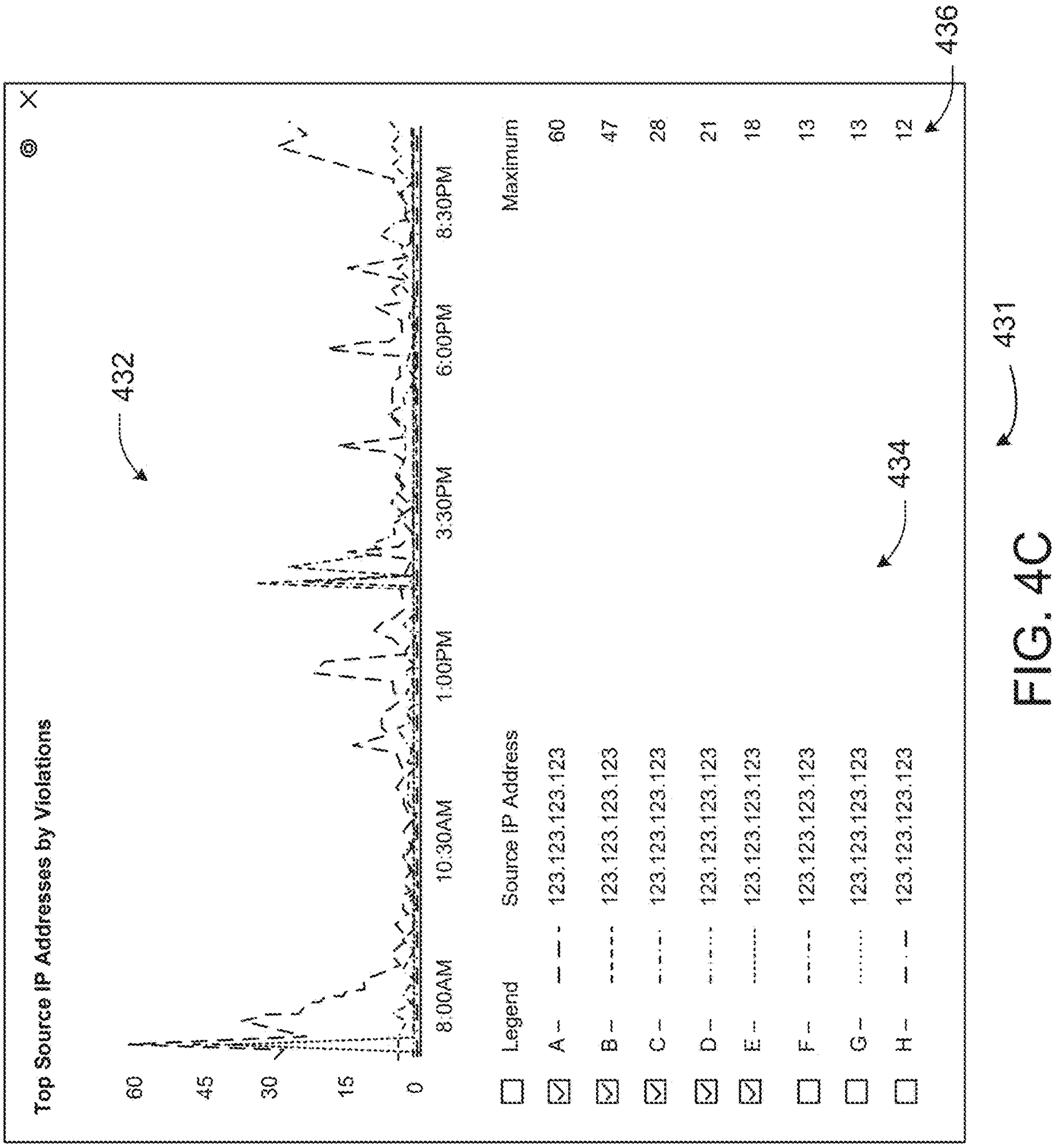

Referring now to FIG. 4C, a visualization 431 provides a time-series (line) graph 432 of source IP addresses by violation count. The time-series graph 432 may depict an element corresponding to each IP address. A corresponding table 434 provides a legend correlating the elements of the time-series graph 432 to a particular address. In some embodiments, the particular addresses may be provided separately for various violation types, such that an IP address may be repeated (and represented by one or more elements of the time-series graph 432). The table 434 can further include statistical data such as an average, total, or maximum number of errors per element 436.

Figure 4D:
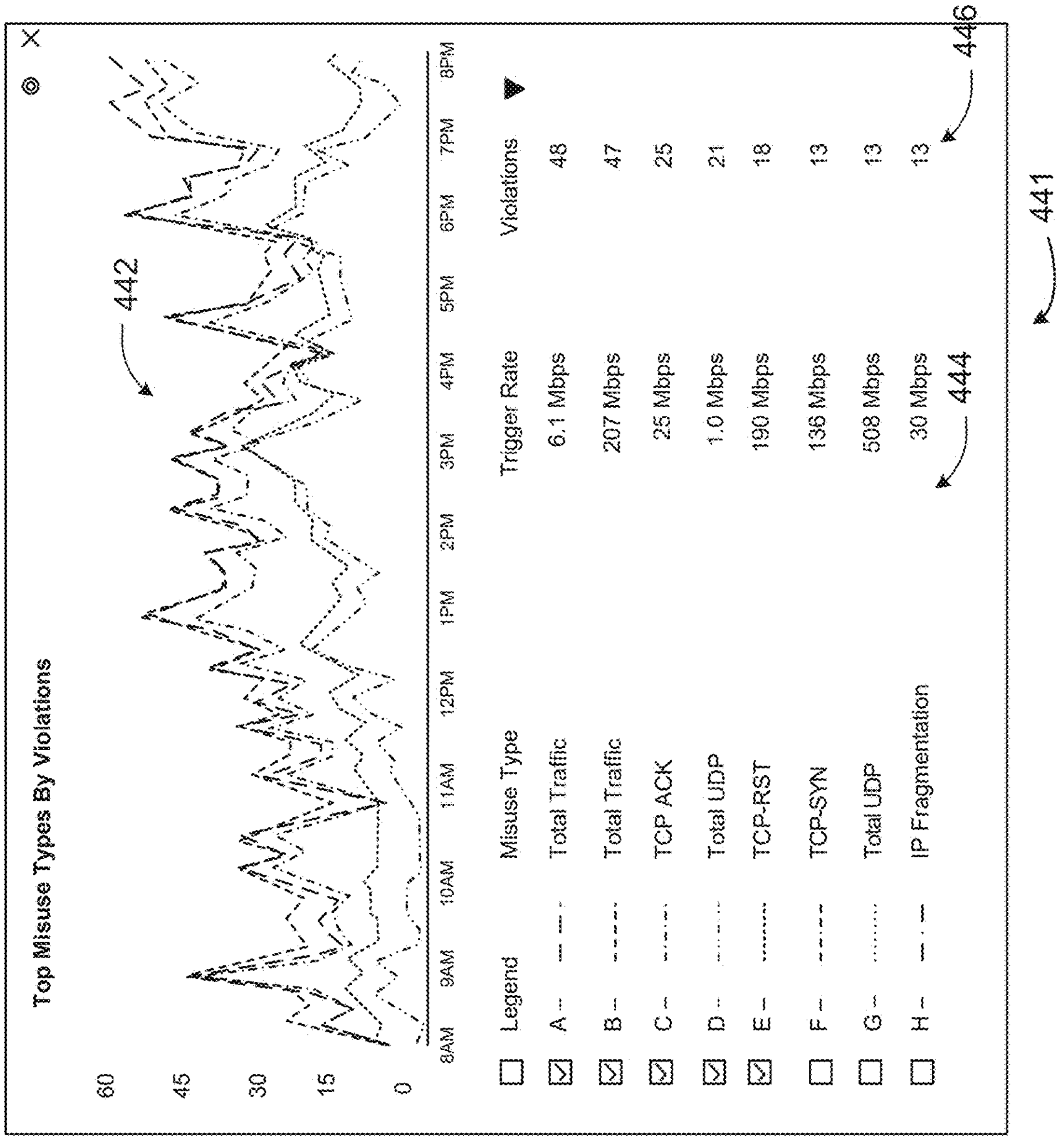

Referring now to FIG. 4D, a visualization 441 provides a time-series (line) graph 442 of misuse types by number of violations. The time-series graph 442 may depict an element corresponding to each violation type (e.g., total traffic, UDP traffic, etc.). A corresponding table 444 provides a legend correlating the elements of the time-series graph 442 to a particular type. The table 444 may include a trigger rate for the various types, along with a number of violations. In some embodiments, the table 444 includes statistical information related to an average, maximum 446, or total number of violations or trigger rate (e.g., throughput).

Figure 4E:
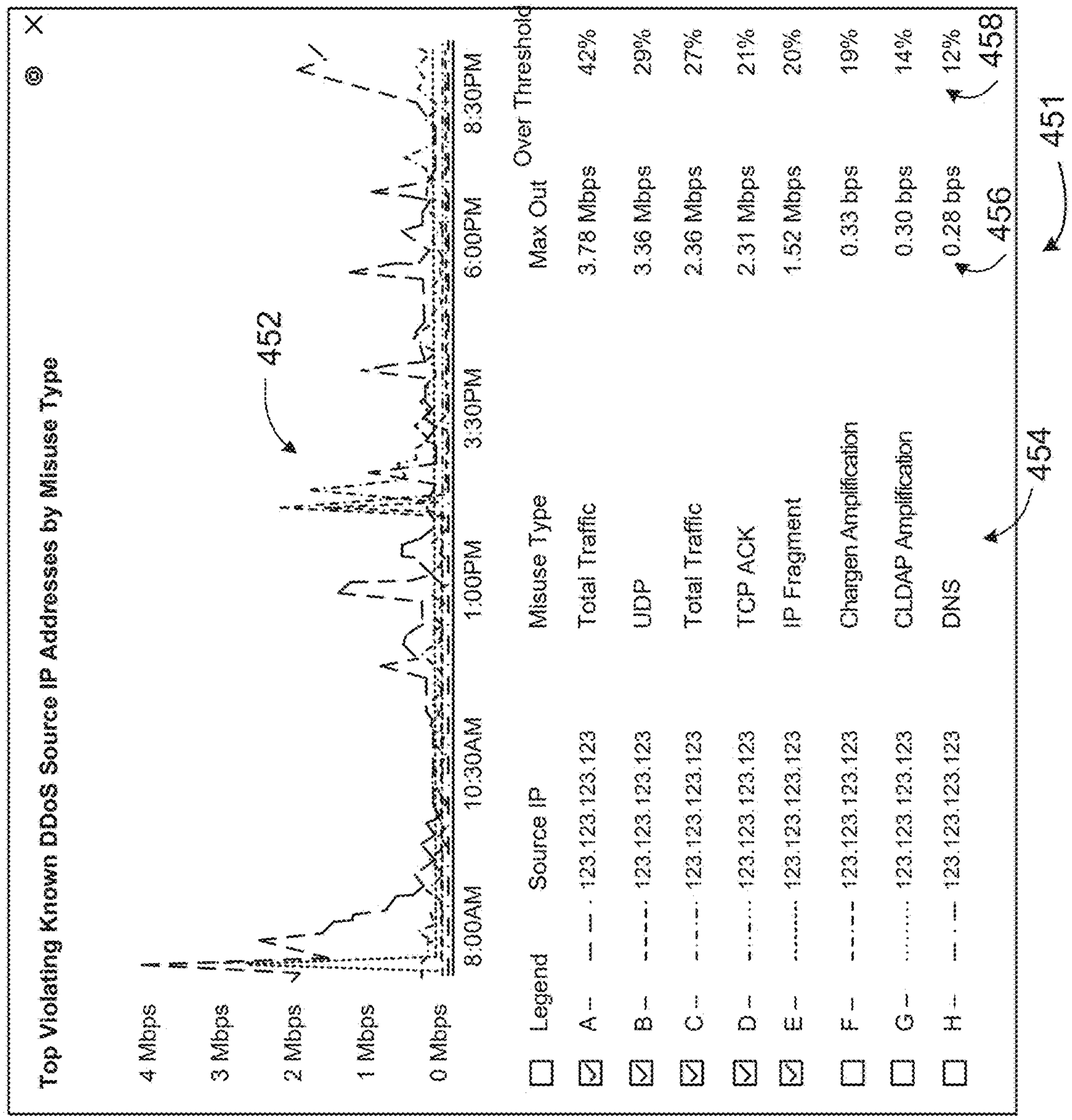

Referring now to FIG. 4E, a visualization 451 provides a time-series (line) graph 452 of traffic bandwidth observed for tuples information corresponding to known DDoS Sources. The time-series graph 452 may depict an element corresponding to a bandwidth of each element, the elements corresponding to a misuse type. One or more threshold lines may further be provided in the line graph 452. A corresponding table 454 provides a legend correlating the elements of the time-series graph 442 to the particular misuse type. The table 454 may include statistical information (e.g., maximum 456, average, or total throughput for the duration), and may include information relative to a threshold 458, such as related to the one or more threshold lines provided in the time-series graph 452 (e.g., as may be provided on a per-type basis).

Figure 4F:
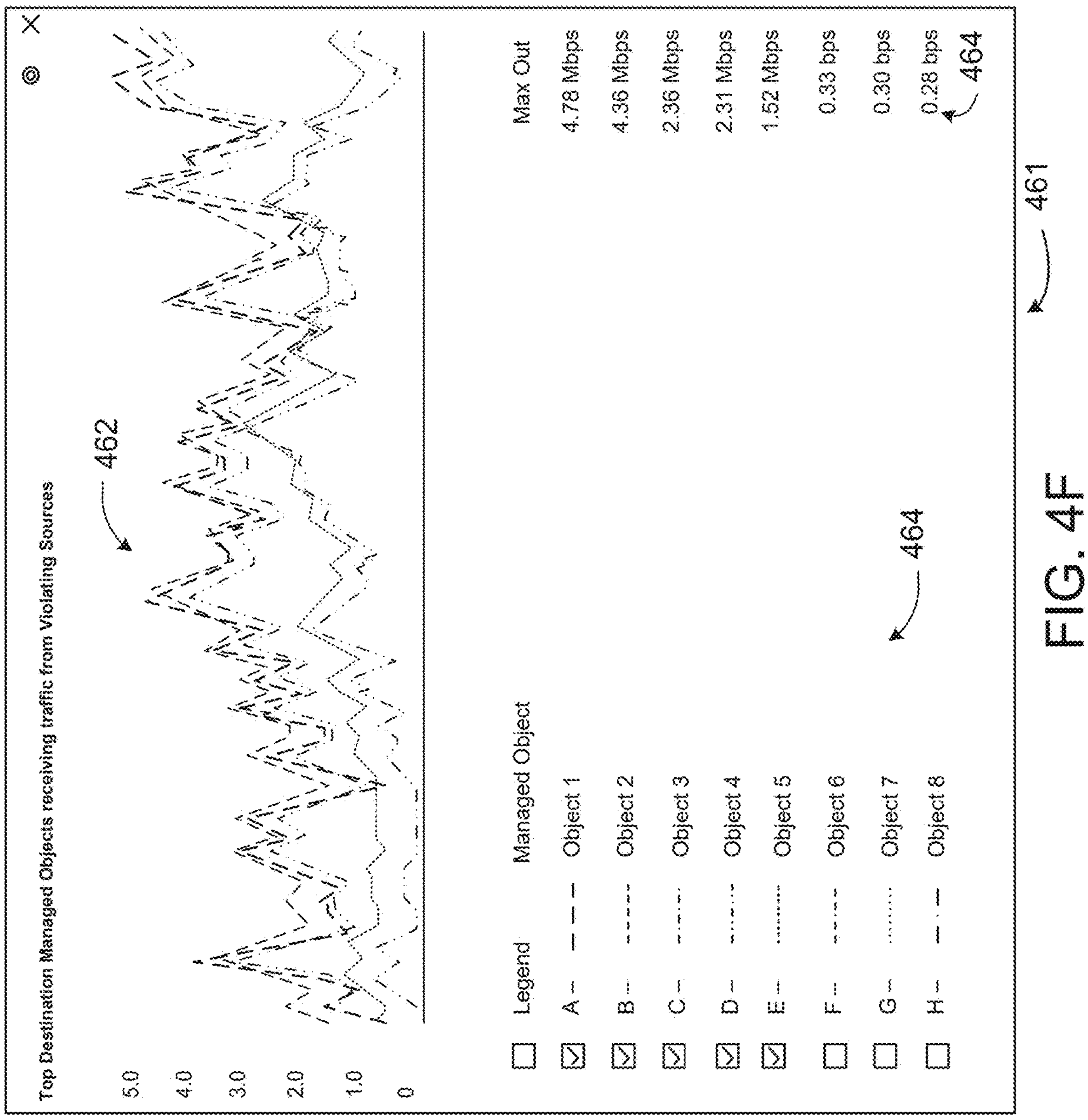
Figure 4G:
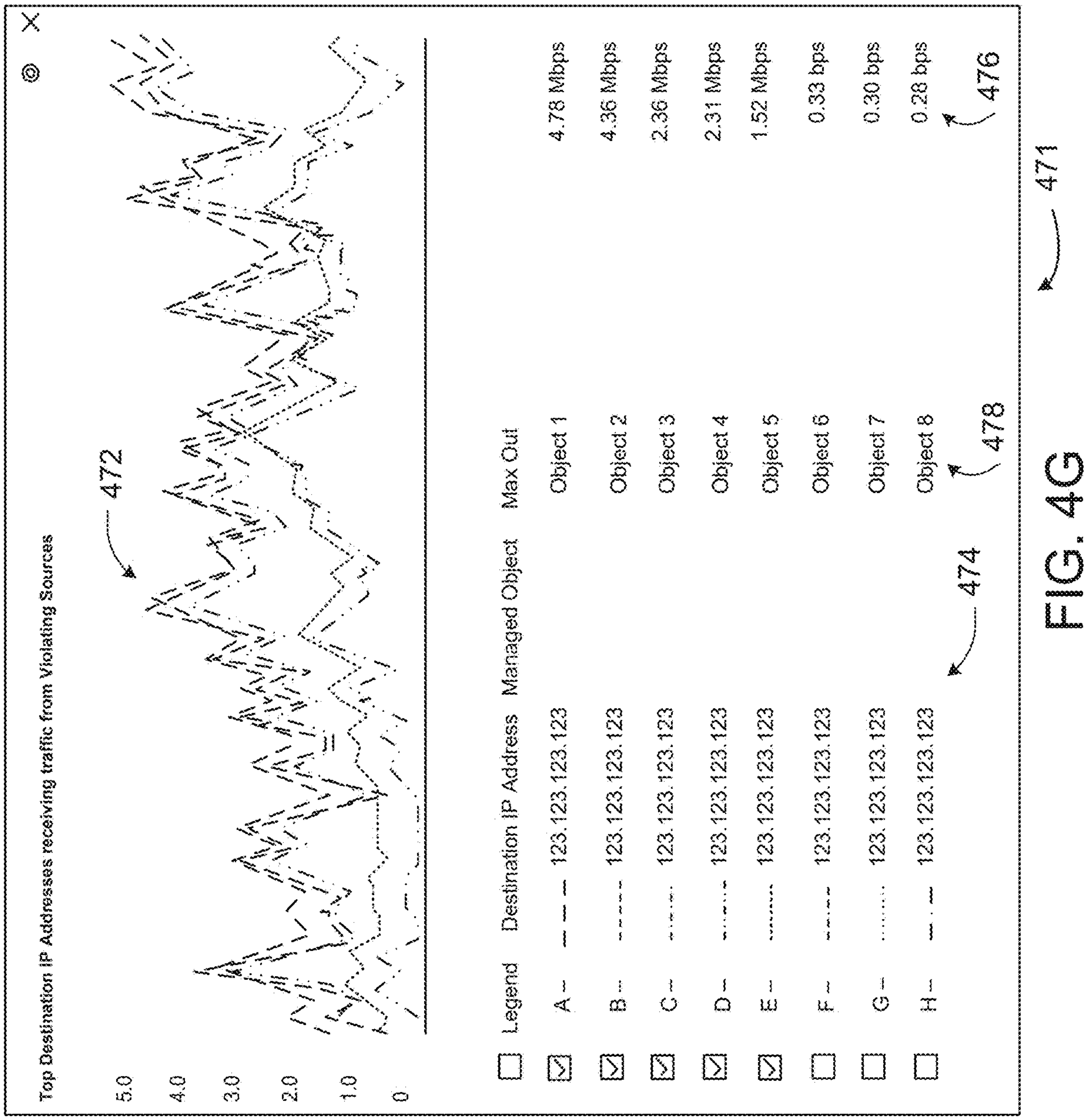

Referring now to FIG. 4F, a visualization 461 provides a time-series (line) graph 462 of traffic bandwidth associated with a destination managed object 107. That is, a single source managed object 107 can generate traffic to various destination managed objects 107, or other destinations. A corresponding table 464 provides a legend correlating the destination managed objects 107. The table 464 may include statistical information (e.g., maximum 464, average, or total throughput for the duration). FIG. 4G, provides a similar visualization 471, except that the time-series (line) graph 462 provides elements (e.g., lines) corresponding to a particular destination address corresponding to a destination managed object 107 rather than the destination managed objects 107 generally. In some embodiments, further addresses which do not correspond to a destination managed object 107 (which may be referred to as unmatched traffic) are included. The corresponding table can include similar statistical data as described above (e.g., the maximum throughput 476), and may further include an indication 478 of an identity of a destination managed object 107 corresponding to a destination address or an indication of an unmatched status of an address (e.g., an omitted address).

Figure 4H:
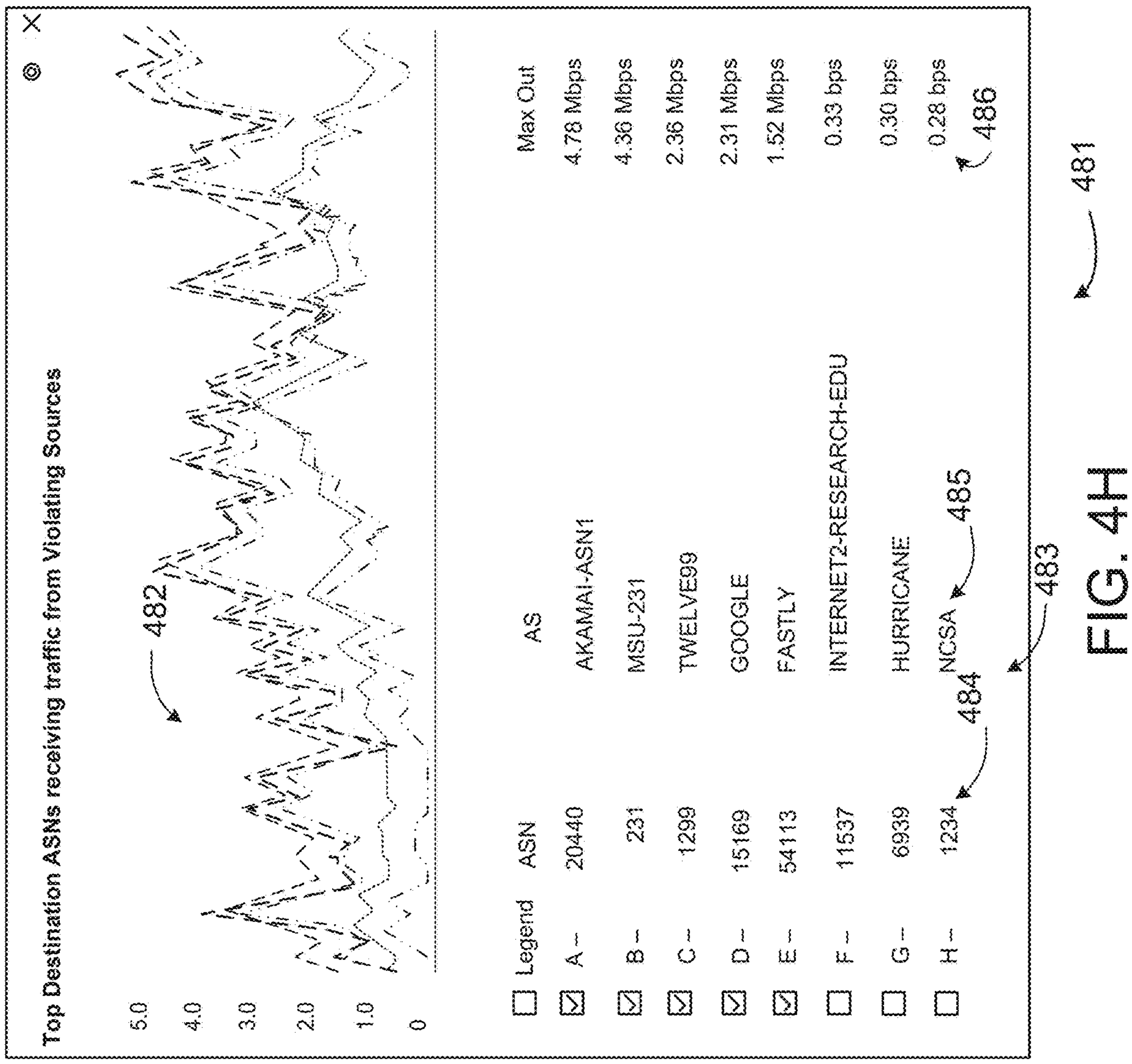
Figure 4I:
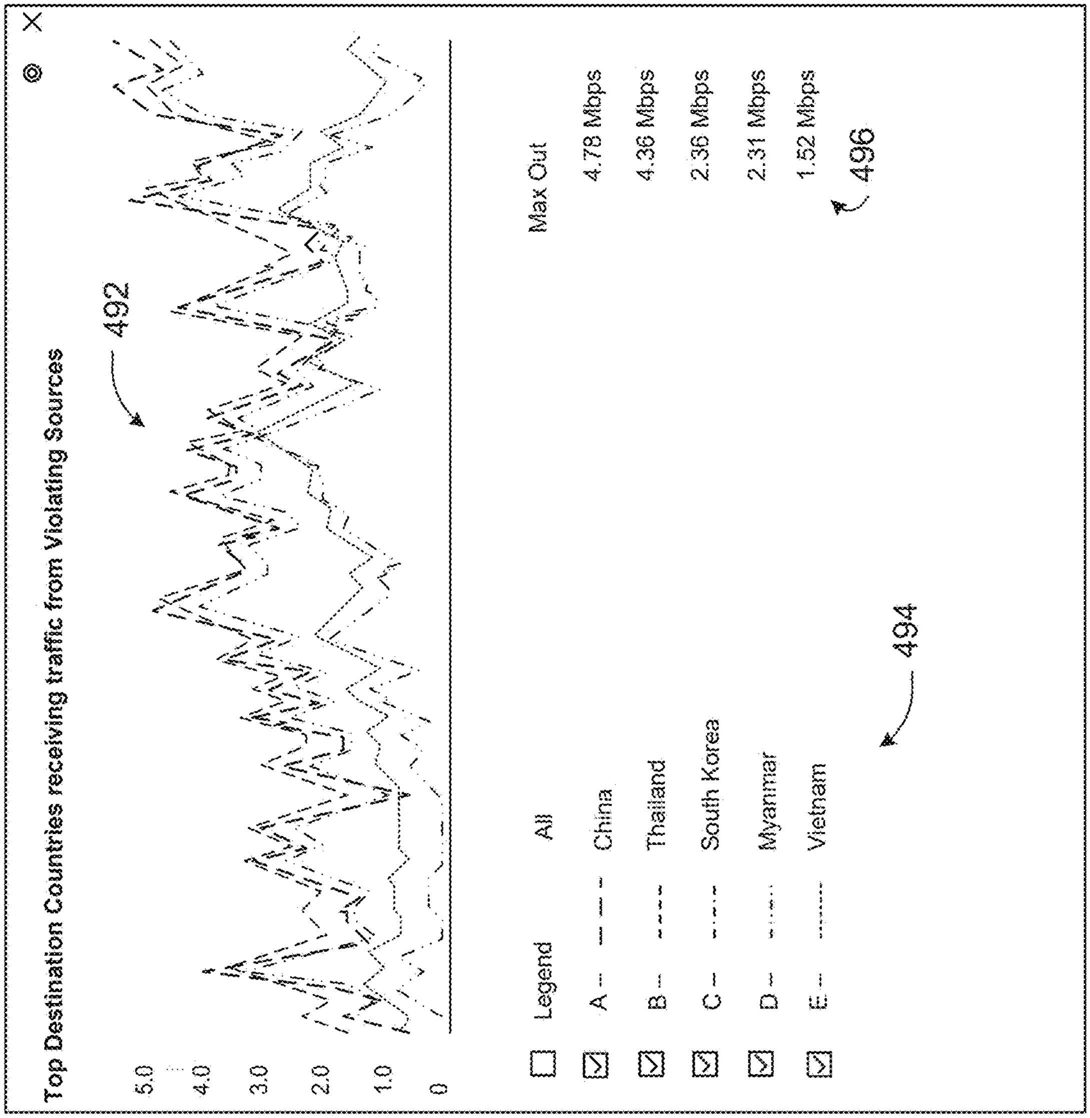

Referring now to FIGS. 4H and 4I, respective of the visualizations 481, 491 provide time-series (line) graphs 482, 492 of traffic bandwidth associated with violating sources corresponding to a particular destination. Particularly, in FIG. 4H, the destination is provided as a table 483 including an Autonomous System Number (ASN) 484 of a routing system (e.g., corresponding to a particular network operator) (AS 485)). FIG. 4I presents destinations organized according to geographic regions or political boundaries (e.g., China, Thailand, or South Korea). Various further organizations or demarcations of destination groupings are contemplated. Tables 483, 494 corresponding to the time-series graphs 482, 492 can include a legend for the graphical elements, along with statistical data such as maximum 486, 496, average, or total throughput.

Figure 5:
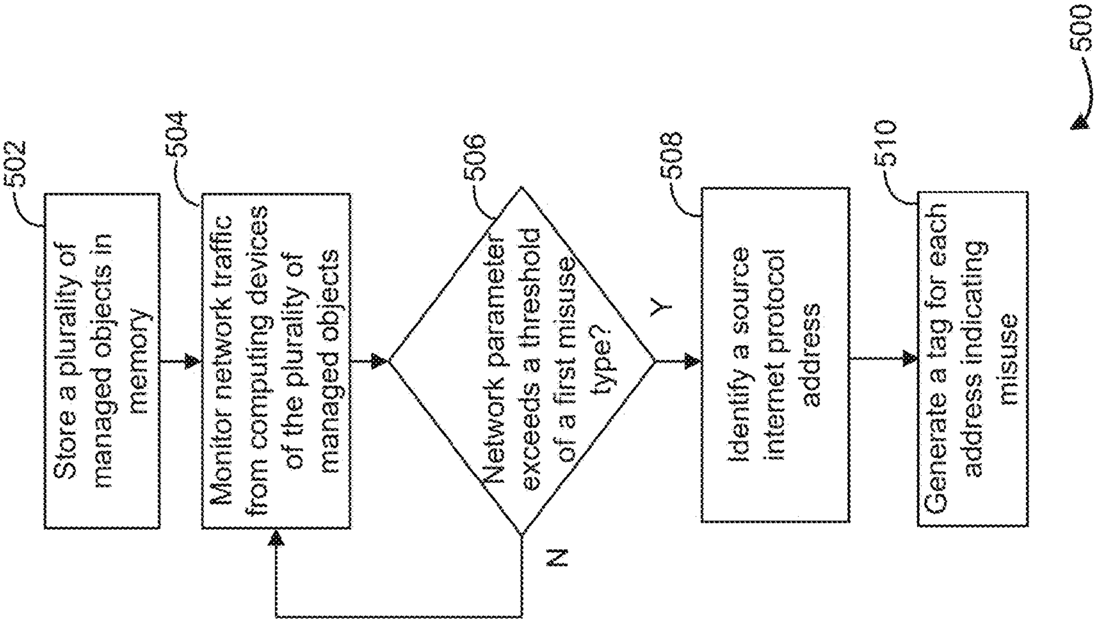
FIG. 5 is a method for source-based misuse detection, in accordance with an implementation.

FIG. 5 is a method 500 for source-based misuse detection, in accordance with an implementation. The method 500 can be performed by one or more system, component or module depicted in FIGS. 1-6C, including, for example, a data processing system or service of a cloud service provider system. The method 500 may include more or fewer operations and the operations may be performed in any order. Performance of the method 500 may aid the data processing system to detect source IP addresses associated with misuse of a communications network. By detecting the source IP addresses, the data processing system can perform one or more countermeasures to protect against the misuse, detect potential attacks (e.g., DDoS attacks) more efficiently and with decreased latency, and mitigate damage to reputation by performing the countermeasures.

At operation 502, the data processing system can store a plurality of managed objects in memory. Each of the plurality of managed objects may correspond to one or more computing devices. The computing devices may be configured to communicate over a communications network. Each of the plurality of managed objects may have a configuration including one or more thresholds corresponding to one or more network parameters for detecting an attack on the communications network. In some embodiments, the configuration may include a plurality of IP address thresholds that at least include a first threshold, a second threshold greater than the first threshold, and a third threshold greater than the second threshold.

At operation 504, the data processing system can monitor network traffic from the one or more computing devices of each of the plurality of managed objects. The data processing system can monitor the network traffic over the communications network. Monitoring can include aggregation of information and provisioning to a user interface of a data processing system, such that the data may be presented according to a predefined period (e.g., a daily or weekly report), or responsive to user access. That is, any information triggered upon a tag event of operation 510, may be accessible via a user interface prior to such triggering event.

At operation 506, the data processing system can determine if a network parameter exceeds a threshold of a first misuse type. For example, the data processing system can detect a first network parameter of managed object network traffic of a first set of computing devices of a first managed object of the plurality of managed objects exceeds a threshold. In some embodiments, the threshold can be a threshold of a first misuse type of a set of misuse types of the configuration of the first managed object.

In some embodiments, the set of misuse types may include one or more of a total traffic type, a character generator (chargen) amplification type, a CLDAP amplification type, a DNS type, a DNS amplification type, an ICMP type, an IP fragment type, an IP private type, an IPv4 protocol type, an L2TP type, an mDNS type, a memcached amplification type, an SQL RS amplification type, a NetBIOS type, an NTP amplification type, an RIPv1 type, an rpcbind type, an SNMP amplification type, an SSDP amplification type, a TCP ACK type, a TCP null type, a TCP RST type, a TCP SYN type, a TCP SYN/ACK amplification type, or a UDP type. Further, in some embodiments, the data processing system 110 is configured to receive one or more user defined criteria for a misuse type, such as by using a source port, destination port, or average number of bytes per packet.

Responsive to the data processing system detecting the first network parameter of the managed object network traffic exceeds the threshold of the first misuse type, at operation 508, the data processing system can identify a source IP address or other tuple information. The source IP address may be for each computing device of the first set of computing devices that include data contributing to the first network parameter exceeding the threshold of the first misuse type. In some embodiments, responsive to identifying the source IP address, the data processing system may detect an amount of source IP addresses exceeds a first IP address threshold of the plurality of IP address thresholds. The data processing system may generate a severity alert corresponding to the first IP address threshold. In some cases, where the first IP address threshold corresponds to the first threshold, the severity alert may be an alert of low severity. In some cases, where the first IP address threshold corresponds to the second threshold, the severity alert may be an alert of medium severity. The data processing system may generate a set of notifications corresponding to the alert of medium severity and event tracking data corresponding to the first set of computing devices. In some cases, where the first IP address threshold corresponds to the first threshold, the severity alert may be an alert of high severity. That is, a threshold can be a threshold for any of various alert severities, according to various embodiments (e.g., high, medium of low, according to the above provided examples). The data processing system may execute one or more mitigation actions corresponding to an auto-mitigation configuration of the first managed object.

In some cases, the data processing system can execute a mitigation protocol. For example, responsive to the data processing system detecting the first network parameter of the managed object network traffic exceeds the threshold of the first misuse type, the data processing system may execute the mitigation protocol. The mitigation protocol may include a protocol to block network traffic from the first set of computing devices associated with the source IP addresses on the communications network.

In some embodiments, the IP address may be substate with or appended by other of the tuple information, or groupings based thereupon. For example, a destination IP address or grouping corresponding thereto (e.g., destination managed object, destination managed IP, destination geographic region). Such a modification may further cause a tag to be generated related to the further tuple information henceforth, at operation 510. Alternatively, such further tuple information can correspond to a second network parameter discussed in further detail below.

At operation 510, the data processing system can generate a tag indicating misuse of the communications network. For example, the data processing system can generate the tag for each source IP address for each computing device of the first set of computing devices indicating misuse of the communications network by the source IP address. In some embodiments, the data processing system can detect a second network parameter of the managed object network traffic of the first set of computing devices exceeds a second threshold of a second misuse type of the set of misuse types of the configuration of the first managed object. Responsive to detecting the second network parameter of the managed object network traffic exceeds the threshold of the second misuse type, the data processing system may identify the source IP address for each computing device of the first set of computing devices. The data processing system may identify the source IP addresses of the first set of computing devices are associated with the tag in the first managed object. For example, the data processing system may refrain from generating a new tag indicating misuse due to identifying the source IP addresses are associated with the tag.

In some embodiments, the data processing system may display a visualization of the managed objects (e.g., data associated with the managed objects). For example, the data processing system may generate a visualization for a computing device. The visualization may include a plurality of graphical depictions that are representative of at least a portion of the plurality of managed objects. Each graphical depiction of the plurality of graphical depictions may be representative of one or more source IP addresses corresponding to one or more computing devices of the portion of the plurality of managed objects. In some cases, a first graphical depiction of the plurality of graphical depictions is representative of the source IP addresses of the first set of computing devices, the first graphical depiction indicating misuse of the communications network by the source IP addresses.

In some examples, the visualization may include a heat map including the plurality of graphical depictions, a timeline, and a plurality of electronic representations of the portion of the plurality of managed objects. The data processing system may visualize the graphical depictions on the timeline. The timeline may be representative of a period of time input by an operator of the computing device. In some examples, the visualization may include a line graph including the plurality of graphical depictions and a timeline. The data processing system may visualize the graphical depictions on the timeline. The timeline may be representative of a period of time input by an operator of the computing device.

According to a non-limiting illustrative dataflow for the method 500, the data processing system 110 stores the various managed objects (at operation 502) including a first managed object including several mobile devices, each having an IP address assigned thereto. At operation 504, the data processing system monitors the several mobile devices. Responsive to the monitoring, the data processing system 110 detects, at operation 506, a network parameter exceeding a threshold for misuse indicia for two of the several mobile devices. For example, the network parameter(s) can include a total bandwidth for a duration, or a quantity of UDP packets exchanged with a geographic region. At operation 508, the data processing system 110 retrieves an IP address of the client devices or tuple information in packets sent (or received) by the two mobile devices. At operation 510, the data processing system 110 generates tags for the two mobile devices. The tags identify the misuse and may be provided to a user interface to display information related to the tags, or to a storage location accessible to a mitigator to automatically generate a mitigation action. For example, the mitigation action can terminate a connection with the two mobile devices (or all of the several mobile devices) to halt the misuse.

At least one aspect is directed to a method for source-based misuse detection. The method can be performed by one or more processors. For example, the method can be performed by one or more processors of a data processing system or a cloud computing system via a virtual machine. The method can include storing, by one or more processors, a plurality of managed objects in memory, each of the plurality of managed objects corresponding to one or more computing devices configured to communicate over a communications network, and each of the plurality of managed objects having a configuration comprising one or more thresholds corresponding to one or more network parameters for detecting an attack on the communications network. The method can include monitoring, by the one or more processors, network traffic from the one or more computing devices of each of the plurality of managed objects over the communications network. The method can include detecting, by the one or more processors, a first network parameter of managed object network traffic of a first set of computing devices of a first managed object of the plurality of managed objects exceeds a threshold of a first misuse type of a set of misuse types of the configuration of the first managed object. Responsive to detecting the first network parameter of the managed object network traffic exceeds the threshold of the first misuse type, the method can include identifying, by the one or more processors, a source internet protocol (IP) address for each computing device of the first set of computing devices. The method can include generating, by the one or more processors, a tag in the first managed object for each source IP address for each computing device of the first set of computing devices indicating misuse of the communications network by the source IP address.

At least one aspect is directed to a system for source-based misuse detection. The system can include one or more processors coupled with memory. The one or more processors can be configured to store a plurality of managed objects in memory, each of the plurality of managed objects corresponding to one or more computing devices configured to communicate over a communications network, and each of the plurality of managed objects having a configuration comprising one or more thresholds corresponding to one or more network parameters for detecting an attack on the communications network. The one or more processors can be configured to monitor network traffic from the one or more computing devices of each of the plurality of managed objects over the communications network. The one or more processors can be configured to detect a first network parameter of managed object network traffic of a first set of computing devices of a first managed object of the plurality of managed objects exceeds a threshold of a first misuse type of a set of misuse types of the configuration of the first managed object. The one or more processors can be configured to identify a source IP address for each computing device of the first set of computing devices based on the first managed object exceeding the threshold. The one or more processors can be configured to generate a tag in the first managed object for each source IP address for each computing device of the first set of computing devices indicating misuse of the communications network by the source IP address.

At least one aspect is directed to a non-transitory computer readable storage medium for source-based misuse detection. The medium can include instructions stored thereon. The instructions, when executed by a processor, cause the processor to store a plurality of managed objects in memory, each of the plurality of managed objects corresponding to one or more computing devices configured to communicate over a communications network, and each of the plurality of managed objects having a configuration comprising one or more thresholds corresponding to one or more network parameters for detecting an attack on the communications network. The instructions, when executed by the processor, cause the processor to monitor network traffic from the one or more computing devices of each of the plurality of managed objects over the communications network. The instructions, when executed by the processor, cause the processor to detect a first network parameter of managed object network traffic of a first set of computing devices of a first managed object of the plurality of managed objects exceeds a threshold of a first misuse type of a set of misuse types of the configuration of the first managed object. The instructions, when executed by the processor, cause the processor to identify a source IP address for each computing device of the first set of computing devices based on the first managed object exceeding the threshold. The instructions, when executed by the processor, cause the processor to generate a tag in the first managed object for each source IP address for each computing device of the first set of computing devices indicating misuse of the communications network by the source IP address.

Computer Network Environment

Figure 6A:
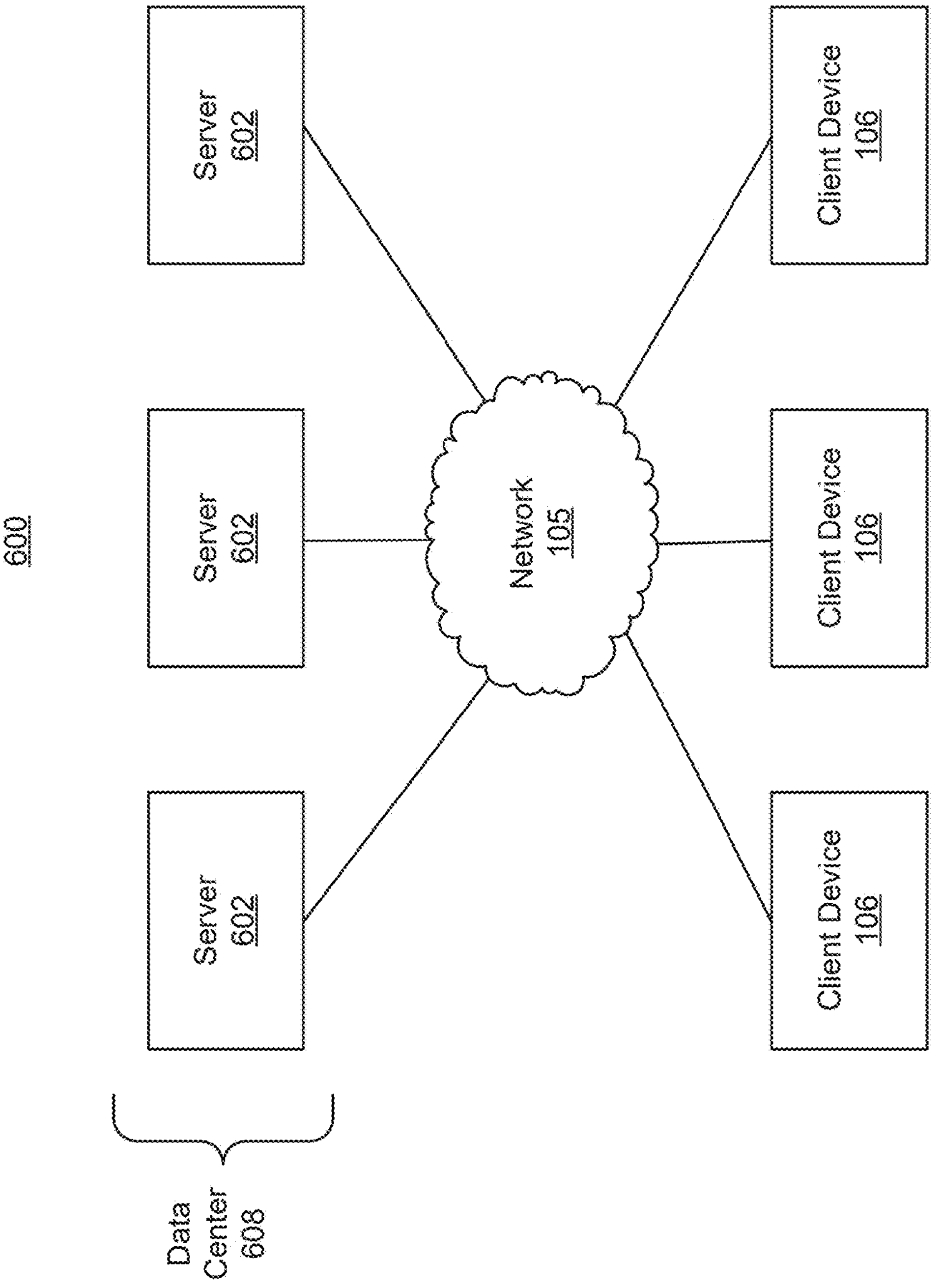
FIG. 6A is a block diagram depicting an implementation of a network environment including a client device in communication with a server device.

FIG. 6A depicts an example network environment that can be used in connection with the methods and systems described herein. In brief overview, the network environment 600 includes one or more client devices 106 (also generally referred to as clients, client node, client machines, client computers, client computing devices, endpoints, or endpoint nodes) in communication with one or more servers 602 (also generally referred to as servers, nodes, or remote machine) via one or more networks 105. In some embodiments, a client device 106 has the capacity to function as both a client node seeking access to resources provided by a server and as a server providing access to hosted resources for other client devices 106.

Although FIG. 6A shows a network 105 between the client devices 106 and the servers 602, the client devices 106 and the servers 602 can be on the same network 105. In embodiments, there are multiple networks 105 between the client devices 106 and the servers 602. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g., FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g., Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 105 can be a type of a broadcast network, a telecommunications network, a data communication network, or a computer network.

The network environment 600 can include multiple, logically grouped servers 602. The logical group of servers can be referred to as a data center 608 (or server farm or machine farm). In embodiments, the servers 602 can be geographically dispersed. The data center 608 can be administered as a single entity or different entities. The data center 608 can include multiple data centers 608 that can be geographically dispersed. The servers 602 within each data center 608 can be homogeneous or heterogeneous (e.g., one or more of the servers 602 or machines 602 can operate according to one type of operating system platform (e.g., WINDOWS NT, manufactured by Microsoft Corp. of Redmond, Washington), while one or more of the other servers 602 can operate on according to another type of operating system platform (e.g., Unix, Linux, or Mac OS X)). The servers 602 of each data center 608 do not need to be physically proximate to another server 602 in the same machine farm 608. Thus, the group of servers 602 logically grouped as a data center 608 can be interconnected using a network. Management of the data center 608 can be de-centralized. For example, one or more servers 602 can comprise components, subsystems and modules to support one or more management services for the data center 608.

Server 602 can be a file server, application server, web server, proxy server, appliance, network appliance, gateway, gateway server, virtualization server, deployment server, SSL VPN server, or firewall. In embodiments, the server 602 can be referred to as a remote machine or a node. Multiple nodes can be in the path between any two communicating servers.

Figure 6B:
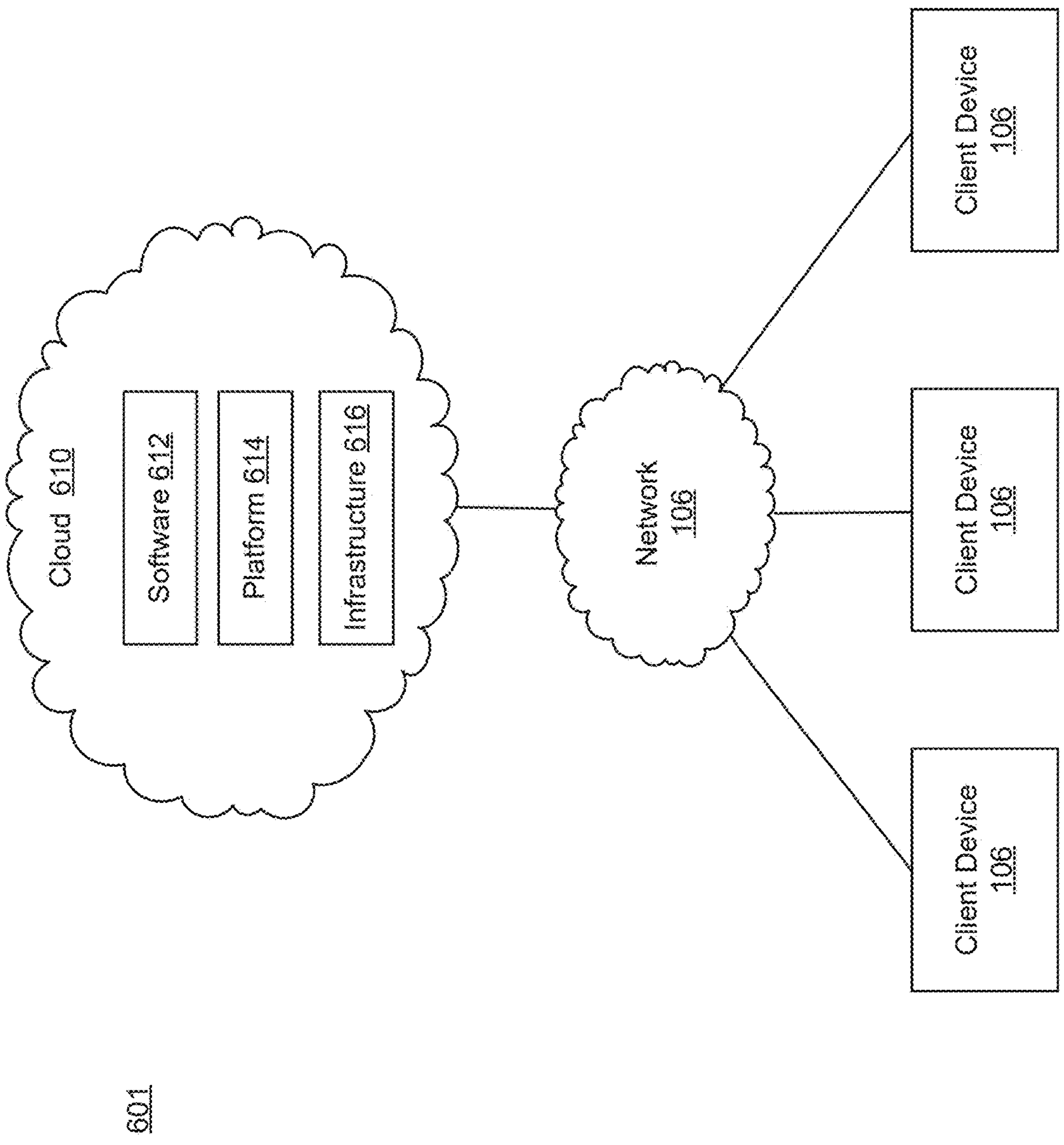
FIG. 6B is a block diagram depicting a cloud computing environment including a client device in communication with cloud service providers.

FIG. 6B illustrates an example cloud computing environment. A cloud computing environment 601 can provide a client device 106 with one or more resources provided by a network environment. The cloud computing environment 601 can include one or more client devices 106, in communication with the cloud 610 over one or more networks 105. Client devices 106 can include, e.g., thick clients, thin clients, and zero clients. A thick client can provide at least some functionality even when disconnected from the cloud 610 or servers 602. A thin client or a zero client can depend on the connection to the cloud 610 or server 602 to provide functionality. A zero client can depend on the cloud 610 or other networks 105 or servers 602 to retrieve operating system data for the client device. The cloud 610 can include back-end platforms, e.g., servers 602, storage, server farms or data centers.

The cloud 610 can be public, private, or hybrid. Public clouds can include public servers 602 that are maintained by third parties to the client devices 106 or the owners of the clients. The servers 602 can be located off-site in remote geographical locations as disclosed above or otherwise. Public clouds can be connected to the servers 602 over a public network. Private clouds can include private servers 602 that are physically maintained by client devices 106 or owners of clients. Private clouds can be connected to the servers 602 over a private network 105. Hybrid clouds 608 can include both the private and public networks 105 and servers 602.

The cloud 610 can also include a cloud-based delivery, e.g., Software as a Service (Saas) 612, Platform as a Service (PaaS) 614, and the Infrastructure as a Service (IaaS) 616. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 106 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client device 106 and server 602 can be deployed as and/or executed on any type and form of computing device, e.g., a computer, network device or appliance capable of communicating on any type and form of network and performing the operations described herein.

Figure 6C:
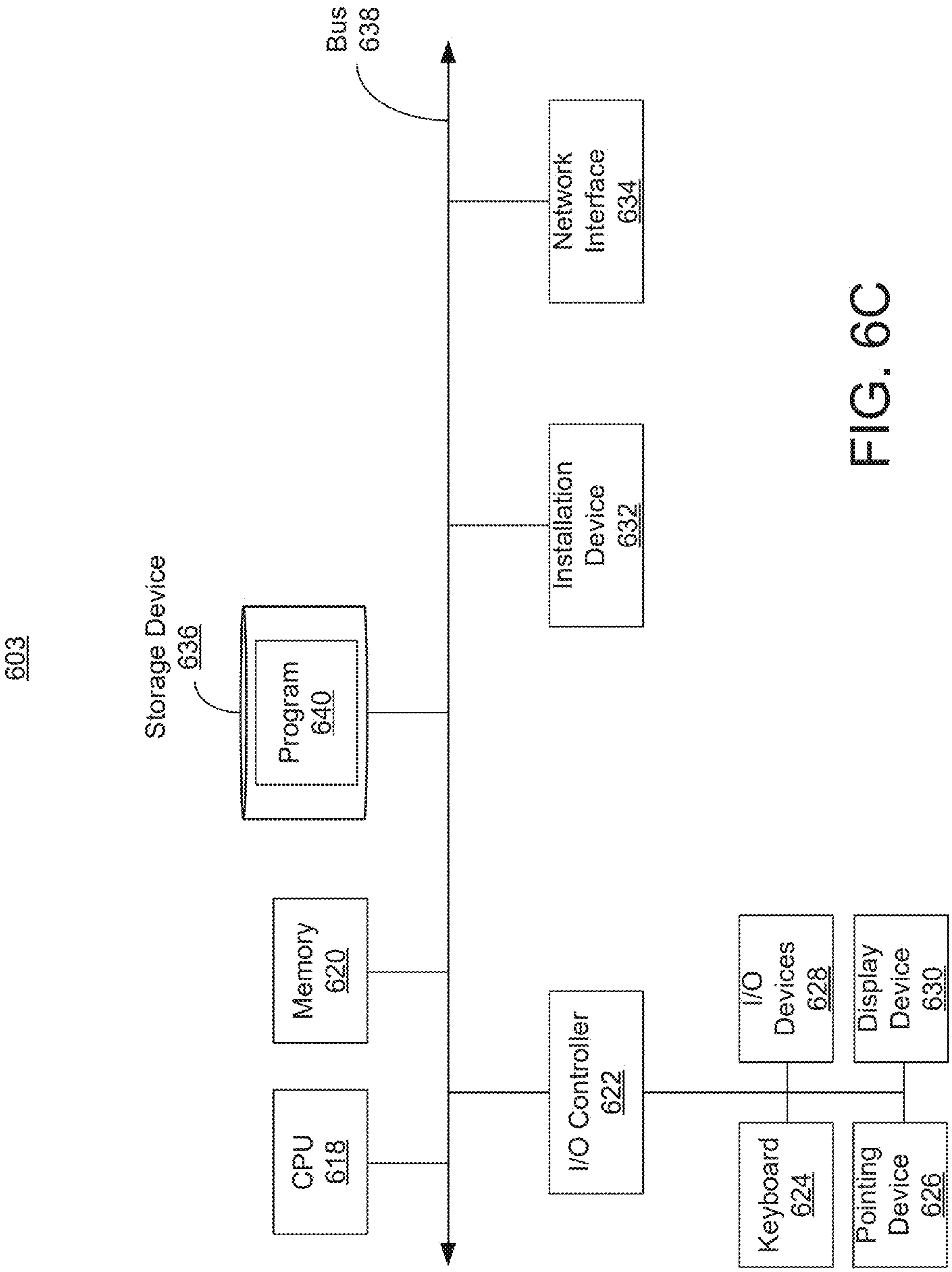
FIG. 6C is a block diagram depicting an implementation of a computing device that can be used in connection with the systems depicted in FIGS. 1-4, and the method depicted in FIG. 5.

FIG. 6C depicts block diagrams of a computing device 603 useful for practicing an embodiment of the client device 106 or a server 602. As shown in FIG. 6C, each computing device 603 can include a central processing unit 618, and a main memory unit 620. As shown in FIG. 6C, a computing device 603 can include one or more of a storage device 636, an installation device 632, a network interface 634, an I/O controller 622, a display device 630, a keyboard 624 or a pointing device 626, e.g., a mouse. The storage device 636 can include, without limitation, a program 640, such as an operating system, software, or software associated with system 100.

The central processing unit 618 is any logic circuitry that responds to and processes instructions fetched from the main memory unit 620. The central processing unit 618 can be provided by a microprocessor unit, e.g.: those manufactured by Intel Corporation of Mountain View, California. The computing device 603 can be based on any of these processors, or any other processor capable of operating as described herein. The central processing unit 618 can utilize instruction level parallelism, thread level parallelism, different levels of cache, and multi-core processors. A multi-core processor can include two or more processing units on a single computing component.

Main memory unit 620 can include one or more memory chips capable of storing data and allowing any storage location to be directly accessed by the microprocessor 618. Main memory unit 620 can be volatile and faster than storage 636 memory. Main memory units 620 can be Dynamic random-access memory (DRAM) or any variants, including static random access memory (SRAM). The memory 620 or the storage 636 can be non-volatile; e.g., non-volatile read access memory (NVRAM). The memory 620 can be based on any type of memory chip, or any other available memory chips. In the example depicted in FIG. 6C, the processor 618 can communicate with memory 620 via a system bus 638.

A wide variety of I/O devices 628 can be present in the computing device 603. Input devices 628 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 628 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 628, display devices 630 or group of devices can be augmented reality devices. The I/O devices can be controlled by an I/O controller 622 as shown in FIG. 6C. The I/O controller 622 can control one or more I/O devices, such as, e.g., a keyboard 624 and a pointing device 626, e.g., a mouse or optical pen. Furthermore, an I/O device can also provide storage and/or an installation device 632 for the computing device 603. In embodiments, the computing device 603 can provide USB connections (not shown) to receive handheld USB storage devices. In embodiments, an I/O device 628 can be a bridge between the system bus 638 and an external communication bus, e.g., a USB bus, a SCSI bus, a FireWire bus, an Ethernet bus, a Gigabit Ethernet bus, a Fibre Channel bus, or a Thunderbolt bus.

In embodiments, display devices 630 can be connected to I/O controller 622. Display devices can include, e.g., liquid crystal displays (LCD), electronic papers (e-ink) displays, flexile displays, light emitting diode displays (LED), or other types of displays. In some embodiments, display devices 630 or the corresponding I/O controllers 622 can be controlled through or have hardware support for OPENGL or DIRECTX API or other graphics libraries. Any of the I/O devices 628 and/or the I/O controller 622 can include any type and/or form of suitable hardware, software, or combination of hardware and software to support, enable or provide for the connection and use of one or more display devices 630 by the computing device 603. For example, the computing device 603 can include any type and/or form of video adapter, video card, driver, and/or library to interface, communicate, connect or otherwise use the display devices 630. In embodiments, a video adapter can include multiple connectors to interface to multiple display devices 630.

The computing device 603 can include a storage device 636 (e.g., one or more hard disk drives or redundant arrays of independent disks) for storing an operating system or other related software, and for storing application software programs 640 such as any program related to the systems, methods, components, modules, elements, or functions depicted in FIG. 1, or 2. Examples of storage device 636 include, e.g., hard disk drive (HDD); optical drive including CD drive, DVD drive, or BLU-RAY drive; solid-state drive (SSD); USB flash drive; or any other device suitable for storing data. Storage devices 636 can include multiple volatile and non-volatile memories, including, e.g., solid state hybrid drives that combine hard disks with solid state cache. Storage devices 636 can be non-volatile, mutable, or read-only. Storage devices 636 can be internal and connect to the computing device 603 via a bus 638. Storage device 636 can be external and connect to the computing device 603 via an I/O device 630 that provides an external bus. Storage device 636 can connect to the computing device 603 via the network interface 634 over a network 105. Some client devices 106 may not require a non-volatile storage device 636 and can be thin clients or zero client devices 106. Some storage devices 636 can be used as an installation device 632 and can be suitable for installing software and programs.

The computing device 603 can include a network interface 634 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 603 can communicate with other computing devices 602 via any type and/or form of gateway or tunneling protocol e.g., Secure Socket Layer (SSL) or Transport Layer Security (TLS), QUIC protocol, or the Citrix Gateway Protocol manufactured by Citrix Systems, Inc. of Ft. Lauderdale, Florida. The network interface 634 can include a built-in network adapter, network interface card, PCMCIA network card, EXPRESSCARD network card, card bus network adapter, wireless network adapter, USB network adapter, modem or any other device suitable for interfacing the computing device 603 to any type of network capable of communication and performing the operations described herein.

A computing device 603 of the sort depicted in FIG. 6C can operate under the control of an operating system, which controls scheduling of tasks and access to system resources. The computing device 603 can be running any operating system configured for any type of computing device, including, for example, a desktop operating system, a mobile device operating system, a tablet operating system, or a smartphone operating system.

The computing device 603 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 603 has sufficient processor power and memory capacity to perform the operations described herein. In some embodiments, the computing device 603 can have different processors, operating systems, and input devices consistent with the device.

In embodiments, the status of one or more client or other computing devices 106, 603 in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 603 in response to the CPU 618 executing an arrangement of instructions contained in main memory 620. Such instructions can be read into main memory 620 from another computer-readable medium, such as the storage device 636. Execution of the arrangement of instructions contained in main memory 620 causes the computing device 603 to perform the illustrative processes described herein. One or more processors in a multi-processing arrangement may also be employed to execute the instructions contained in main memory 620. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

The foregoing detailed description includes illustrative examples of various aspects and embodiments and provides an overview or framework for understanding the nature and character of the claimed aspects and embodiments. The drawings provide illustration and a further understanding of the various aspects and embodiments and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 110) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all embodiments, and the described program components can be included in a single hardware or software product.

The phraseology and terminology used herein is for the purpose of description and should not be regarded as limiting. Any references to embodiments or elements or acts of the systems and methods herein referred to in the singular may also embrace embodiments including a plurality of these elements, and any references in plural to any implementation or element or act herein may also embrace embodiments including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing embodiments are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method comprising:

storing, by one or more processors, a plurality of managed objects in memory, each of the plurality of managed objects corresponding to one or more computing devices configured to communicate over a communications network, and each of the plurality of managed objects having a configuration comprising one or more thresholds corresponding to one or more network parameters for detecting an attack on the communications network;

monitoring, by the one or more processors, network traffic from the one or more computing devices of each of the plurality of managed objects over the communications network;

detecting, by the one or more processors, a first network parameter of managed object network traffic of a first set of computing devices of a first managed object of the plurality of managed objects exceeds a threshold of a first misuse type of a set of misuse types of the configuration of the first managed object, wherein the first misuse type corresponds to a distributed denial of service (DDoS) attack type;

responsive to detecting the first network parameter of the managed object network traffic exceeds the threshold of the first misuse type, identifying, by the one or more processors, a source internet protocol (IP) address for each computing device of the first set of computing devices; and generating, by the one or more processors, a tag in the first managed object for each source IP address for each computing device of the first set of computing devices indicating misuse of the communications network by the source IP address, wherein the tag is indexed to the source IP address within the first managed object to enhance searchability of the source IP address in a log of the first managed object.

2. The method of claim 1, wherein the plurality of managed objects having the configuration further comprises a plurality of IP address thresholds, the plurality of IP address thresholds at least comprising:

a first threshold, a second threshold greater than the first threshold, and a third threshold greater than the second threshold.

3. The method of claim 2, further comprising:

responsive to identifying, by the one or more processors, the source IP address for each computing device of the first set of computing devices, detecting, by the one or more processors, an amount of source IP addresses of the first set of computing devices; and identifying, by the one or more processors, the amount of source IP addresses exceeds a first IP address threshold of the plurality of IP address thresholds.

4. The method of claim 3, further comprising:

responsive to identifying, by the one or more processors, the amount of source IP addresses exceeds the first IP address threshold, generating, by the one or more processors, a severity alert corresponding to the first IP address threshold, wherein the first IP address threshold corresponds to the first threshold, and the severity alert is an alert of low severity; or wherein the first IP address threshold corresponds to the second threshold, and the severity alert is an alert of medium severity;

generating, by the one or more processors, a set of notifications corresponding to the alert of medium severity and event tracking data corresponding to the first set of computing devices; or wherein the first IP address threshold corresponds to the third threshold, and the severity alert is an alert of high severity; and executing, by the one or more processors, one or more mitigation actions corresponding to an auto-mitigation configuration of the first managed object.

5. The method of claim 1, further comprising:

detecting, by the one or more processors, a second network parameter of the managed object network traffic of the first set of computing devices exceeds a second threshold of a second misuse type of the set of misuse types of the configuration of the first managed object;

responsive to detecting, by the one or more processors, the second network parameter of the managed object network traffic exceeds the threshold of the second misuse type, identifying, by the one or more processors, the source IP address for each computing device of the first set of computing devices; and identifying, by the one or more processors, the source IP addresses of the first set of computing devices are associated with the tag in the first managed object.

6. The method of claim 1, further comprising:

generating a visualization for a computing device, the visualization comprising a plurality of graphical depictions that are representative of at least a portion of the plurality of managed objects, each graphical depiction of the plurality of graphical depictions representative of one or more source IP addresses corresponding to one or more computing devices of the portion of the plurality of managed objects, wherein a first graphical depiction of the plurality of graphical depictions is representative of the source IP addresses of the first set of computing devices, the first graphical depiction indicating misuse of the communications network by the source IP addresses.

7. The method of claim 6, wherein the visualization comprises a heat map comprising the plurality of graphical depictions, a timeline, and a plurality of electronic representations of the portion of the plurality of managed objects, wherein the graphical depictions are visualized on the timeline that is representative of a period of time input by an operator of the computing device.

8. The method of claim 6, wherein the visualization comprises a line graph comprising the plurality of graphical depictions and a timeline, wherein the graphical depictions are visualized on the timeline that is representative of a period of time input by an operator of the computing device.

9. The method of claim 1, wherein the set of misuse types comprises one or more of a total traffic type, a character generator amplification type, a connectionless lightweight directory access protocol (CLDAP) amplification type, a domain name system (DNS) type, a DNS amplification type, an internet control message protocol (ICMP) type, an IP fragment type, an IP private type, an IP version four (IPv4) protocol type, a layer two tunneling protocol (L2TP) type, a multicast DNS (mDNS) type, a memcached amplification type, a structured query language (SQL) reporting service (RS) amplification type, a network basic input/output (NetBIOS) type, a network time protocol (NTP) amplification type, a routing information protocol version one (RIPv1) type, a rpcbind type, a simple network management protocol (SNMP) amplification type, a simple service discovery protocol (SSDP) amplification type, a transmission control protocol (TCP) acknowledgment (ACK) type, a TCP null type, a TCP reset (TCP RST) type, a TCP synchronize (TCP SYN) type, a TCP SYN/ACK amplification type, or a user datagram protocol (UDP) type, or a user defined type defined according to criteria comprising one or more of the group consisting of a source port, a destination port, a protocol, and a number of bytes per-packet.

10. The method of claim 1, further comprising:

responsive to detecting the first network parameter of the managed object network traffic exceeds the threshold of the first misuse type, executing, by the one or more processors, a mitigation protocol to block network traffic from the first set of computing devices associated with the source IP addresses on the communications network.

11. A system comprising:

a data processing system comprising one or more processors coupled with memory, the data processing system configured to:

store a plurality of managed objects in memory, each of the plurality of managed objects corresponding to one or more computing devices configured to communicate over a communications network, and each of the plurality of managed objects having a configuration comprising one or more thresholds corresponding to one or more network parameters for detecting an attack on the communications network;

monitor network traffic from the one or more computing devices of each of the plurality of managed objects over the communications network;

detect a first network parameter of managed object network traffic of a first set of computing devices of a first managed object of the plurality of managed objects exceeds a threshold of a first misuse type of a set of misuse types of the configuration of the first managed object, wherein the first misuse type corresponds to a distributed denial of service (DDoS) attack type;

identify a source internet protocol (IP) address for each computing device of the first set of computing devices based on the first managed object exceeding the threshold; and generate a tag in the first managed object for each source IP address for each computing device of the first set of computing devices indicating misuse of the communications network by the source IP address, wherein the tag is indexed to the source IP address within the first managed object to enhance searchability of the source IP address in a log of the first managed object.

12. The system of claim 11, wherein the plurality of managed objects having the configuration further comprises a plurality of IP address thresholds, the plurality of IP address thresholds at least comprising a first threshold, a second threshold greater than the first threshold, and a third threshold greater than the second threshold.

13. The system of claim 12, wherein the data processing system is further configured to:

detect an amount of source IP addresses of the first set of computing devices based on the source IP address for each computing device of the first set of computing devices; and identify the amount of source IP addresses exceeds a first IP address threshold of the plurality of IP address thresholds.

14. The system of claim 13, wherein the data processing system is further configured to:

generate a severity alert corresponding to the first IP address threshold based on the amount of source IP addresses exceeding the first IP address threshold, wherein the first IP address threshold corresponds to the first threshold, and the severity alert is an alert of low severity; or wherein the first IP address threshold corresponds to the second threshold, and the severity alert is an alert of medium severity; and generate a set of notifications corresponding to the alert of medium severity and event tracking data corresponding to the first set of computing devices; or wherein the first IP address threshold corresponds to the third threshold, and the severity alert is an alert of high severity; and execute one or more mitigation actions corresponding to an auto-mitigation configuration of the first managed object.

15. The system of claim 11, wherein the data processing system is further configured to:

detect a second network parameter of the managed object network traffic of the first set of computing devices exceeds a second threshold of a second misuse type of the set of misuse types of the configuration of the first managed object;

identify the source IP address for each computing device of the first set of computing devices based on the second network parameter of the managed object network traffic exceeding the threshold of the second misuse type; and identify the source IP addresses of the first set of computing devices are associated with the tag in the first managed object.

16. The system of claim 11, wherein the data processing system is further configured to:

generate a visualization for a computing device, the visualization comprising a plurality of graphical depictions that are representative of at least a portion of the plurality of managed objects, each graphical depiction of the plurality of graphical depictions representative of one or more source IP addresses corresponding to one or more computing devices of the portion of the plurality of managed objects, wherein a first graphical depiction of the plurality of graphical depictions is representative of the source IP addresses of the first set of computing devices, the first graphical depiction indicating misuse of the communications network by the source IP addresses.

17. The system of claim 16, wherein the visualization comprises a depiction comprising the plurality of graphical depictions, a timeline, and a plurality of electronic representations of the portion of the plurality of managed objects, wherein the graphical depictions are visualized on the timeline that is representative of a period of time input by an operator of the computing device.

18. The system of claim 11, wherein the data processing system is further configured to:

execute a mitigation protocol to block network traffic from the first set of computing devices associated with the source IP addresses on the communications network based on the first network parameter of the managed object network traffic exceeding the threshold of the first misuse type.

19. A non-transitory computer readable storage medium comprising instructions stored thereon that, when executed by a processor, cause the processor to:

store a plurality of managed objects in memory, each of the plurality of managed objects corresponding to one or more computing devices configured to communicate over a communications network, and each of the plurality of managed objects having a configuration comprising one or more thresholds corresponding to one or more network parameters for detecting an attack on the communications network;

monitor network traffic from the one or more computing devices of each of the plurality of managed objects over the communications network;

detect a first network parameter of managed object network traffic of a first set of computing devices of a first managed object of the plurality of managed objects exceeds a threshold of a first misuse type of a set of misuse types of the configuration of the first managed object, wherein the first misuse type corresponds to a distributed denial of service (DDoS) attack type;

identify a source internet protocol (IP) address for each computing device of the first set of computing devices based on the first managed object exceeding the threshold; and generate a tag in the first managed object for each source IP address for each computing device of the first set of computing devices indicating misuse of the communications network by the source IP address, wherein the tag is indexed to the source IP address within the first managed object to enhance searchability of the source IP address in a log of the first managed object.

20. The non-transitory computer readable storage medium of claim 19, wherein the plurality of managed objects having the configuration further comprises a plurality of IP address thresholds, the plurality of IP address thresholds at least comprising a first threshold, a second threshold greater than the first threshold, and a third threshold greater than the second threshold.

* * * * *